(12) United States Patent
Kumazaki et al.

(10) Patent No.: US 9,079,484 B2
(45) Date of Patent: Jul. 14, 2015

(54) CONTROL DEVICE FOR VEHICLE POWER TRANSMISSION DEVICE

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 448 days.

(21) Appl. No.: 13/257,450

(22) PCT Filed: Mar. 19, 2009

(86) PCT No.: PCT/JP2009/055494
§ 371 (c)(1),
(2), (4) Date: Sep. 19, 2011

(87) PCT Pub. No.: WO2010/106671
PCT Pub. Date: Sep. 23, 2010

(65) Prior Publication Data
US 2012/0022737 A1    Jan. 26, 2012

(51) Int. Cl.
*F16H 61/02* (2006.01)
*B60K 6/445* (2007.10)
(Continued)

(52) U.S. Cl.
CPC .............. *B60K 6/445* (2013.01); *B60K 6/365* (2013.01); *B60K 6/547* (2013.01); *B60K 23/00* (2013.01);
(Continued)

(58) Field of Classification Search
CPC . Y02T 10/7258; Y02T 10/7077; Y02T 10/56; Y02T 10/6217; Y02T 10/6239; Y02T 10/642; B60L 2240/36; B60L 2240/485; B60L 2240/425; B60L 2240/423; B60L 2240/421; B60L 7/14; B60L 11/123; B60L 11/14; B60W 2510/107; B60W 2510/087; B60W 10/08; B60W 10/115; B60W 20/00; B60W 30/1827; B60K 23/00; B60K 6/445; B60K 1/02; B60K 6/365; B60K 6/547; F16H 59/72; F16H 61/0213; F16H 2003/445; F16H 2037/0866; F16H 2200/0043; F16H 2200/2007; F16H 2200/2043
USPC ....................................... 701/22; 180/65.275
See application file for complete search history.

(56) References Cited

U.S. PATENT DOCUMENTS 5,672,137 A * 9/1997 Adachi et al. ................... 477/45
5,789,882 A   8/1998 Ibaraki et al.
(Continued)

FOREIGN PATENT DOCUMENTS

DE    44 38 914 A1    5/1996
EP    0 913 287 A2    5/1999
(Continued)

OTHER PUBLICATIONS

Johnson, R.W., Evans, J.L., Jacobsen, P., Thompson, J.R., Christopher, M., "The changing automotive environment: high-temperature electronics," vol. 27, Issue: 3, Publication Year: 2004, pp. 164-176.*
(Continued)

*Primary Examiner* — Tuan C. To
(74) *Attorney, Agent, or Firm* — Oliff PLC

(57) ABSTRACT

It is provided a control device for a vehicle power transmission device including a shifting portion and an electric motor that provides regeneration via the shifting portion, the control device executing a downshift of the shifting portion if a traveling loss in the vehicle power transmission device after the shift is smaller than a traveling loss in the vehicle power transmission device at a current gear ratio during regenerative traveling, and the traveling loss in the vehicle power transmission device including at least one of a loss in the shifting portion and a loss in the electric motor, the loss in the shifting portion being calculated based on the operating oil temperature of the shifting portion and the loss in the electric motor being calculated based on the temperature of the electric motor.

20 Claims, 16 Drawing Sheets

(51) Int. Cl.
| | |
|---|---|
| B60K 23/00 | (2006.01) |
| B60K 6/365 | (2007.10) |
| B60K 6/547 | (2007.10) |
| B60L 7/14 | (2006.01) |
| B60L 11/12 | (2006.01) |
| B60L 11/14 | (2006.01) |
| B60W 10/08 | (2006.01) |
| B60W 10/115 | (2012.01) |
| B60W 30/18 | (2012.01) |
| B60K 1/02 | (2006.01) |
| B60W 20/00 | (2006.01) |
| F16H 59/72 | (2006.01) |
| F16H 3/44 | (2006.01) |
| F16H 37/08 | (2006.01) |

(52) U.S. Cl.
CPC .............. *B60L 7/14* (2013.01); *B60L 11/123* (2013.01); *B60L 11/14* (2013.01); *B60W 10/08* (2013.01); *B60W 10/115* (2013.01); *B60W 30/18127* (2013.01); *B60K 1/02* (2013.01); *B60L 2240/36* (2013.01); *B60L 2240/421* (2013.01); *B60L 2240/423* (2013.01); *B60L 2240/425* (2013.01); *B60L 2240/485* (2013.01); *B60W 20/00* (2013.01); *B60W 2510/087* (2013.01); *B60W 2510/107* (2013.01); *F16H 59/72* (2013.01); *F16H 61/0213* (2013.01); *F16H 2003/445* (2013.01); *F16H 2037/0866* (2013.01); *F16H 2200/0043* (2013.01); *F16H 2200/2007* (2013.01); *F16H 2200/2043* (2013.01); *Y02T 10/56* (2013.01); *Y02T 10/6217* (2013.01); *Y02T 10/6239* (2013.01); *Y02T 10/642* (2013.01); *Y02T 10/7077* (2013.01); *Y02T 10/7258* (2013.01)

(56) References Cited

U.S. PATENT DOCUMENTS

| | | | | |
|---|---|---|---|---|
| 5,961,419 | A * | 10/1999 | Hisano et al. | 477/97 |
| 6,098,733 | A | 8/2000 | Ibaraki et al. | |
| 6,186,255 | B1 | 2/2001 | Shimasaki et al. | |
| 7,329,204 | B2 * | 2/2008 | Senda et al. | 477/5 |
| 2002/0107110 | A1 * | 8/2002 | Takatori et al. | 477/156 |
| 2002/0107617 | A1 * | 8/2002 | Tomikawa | 701/22 |
| 2003/0153428 | A1 * | 8/2003 | Kitano et al. | 477/5 |
| 2008/0300744 | A1 * | 12/2008 | Katsuta et al. | 701/22 |
| 2009/0048050 | A1 * | 2/2009 | Kamada et al. | 475/150 |
| 2009/0069966 | A1 * | 3/2009 | Tabata et al. | 701/22 |
| 2009/0094973 | A1 * | 4/2009 | Cheong | 60/422 |
| 2009/0236159 | A1 * | 9/2009 | Shibata et al. | 180/65.235 |
| 2009/0242290 | A1 * | 10/2009 | Kobayashi | 180/65.265 |
| 2009/0318261 | A1 * | 12/2009 | Tabata et al. | 477/3 |
| 2010/0147610 | A1 * | 6/2010 | Katsuta et al. | 180/65.265 |
| 2010/0185350 | A1 * | 7/2010 | Okamura et al. | 701/22 |
| 2010/0204862 | A1 * | 8/2010 | Uejima et al. | 701/22 |
| 2012/0022737 | A1 * | 1/2012 | Kumazaki et al. | 701/22 |

FOREIGN PATENT DOCUMENTS

| | | | |
|---|---|---|---|
| JP | 05340372 | A * | 12/1993 |
| JP | A-9-98516 | | 4/1997 |
| JP | A-9-117008 | | 5/1997 |
| JP | A-11-125328 | | 5/1999 |
| JP | A-2000-134713 | | 5/2000 |
| JP | 2003065102 | A * | 3/2003 |
| JP | A-2006-118667 | | 5/2006 |
| JP | A-2007-50866 | | 3/2007 |
| JP | A-2008-137518 | | 6/2008 |
| JP | A-2008-149907 | | 7/2008 |

OTHER PUBLICATIONS

Shaotang Chen, Erkuan Zhong, Lipo, T.A., "A new approach to motor condition monitoring in induction motor drives," Publication Year: 1993, pp. 645-650 vol. 1.*

Sanada, K., "A study on full-electric control system of hydro static transmission for construction machines," Publication Year: 2004, pp. 1153-1158 vol. 2.*

International Search Report issued in International Application No. PCT/JP2009/055494 on May 12, 2009 (with translation).

* cited by examiner

|     | C1 | C2 | C3 | B1 | B2  | F | GEAR RATIO | STEP |
|-----|----|----|----|----|-----|---|------------|------|
| 1st | ○  |    |    |    | (○) | ○ | 3.20       |      |
|     |    |    |    |    |     |   |            | 1.86 |
| 2nd | ○  |    |    | ○  |     |   | 1.72       |      |
|     |    |    |    |    |     |   |            | 1.72 |
| 3rd | ○  | ○  |    |    |     |   | 1.00       |      |
|     |    |    |    |    |     |   |            | 1.49 |
| 4th |    | ○  |    | ○  |     |   | 0.67       |      |
| Rev |    |    | ○  |    | ○   |   | 2.04       |      |
| N   |    |    |    |    |     |   |            |      |

○ ENGAGEMENT

CONTROL DEVICE FOR VEHICLE POWER TRANSMISSION DEVICE

TECHNICAL FIELD

The present invention relates to a control device for a vehicle power transmission device and particularly to a technique for enabling a gear shifting in consideration of a loss in a shifting mechanism, etc., making up the vehicle power transmission device during regenerative traveling.

BACKGROUND ART

A so-called hybrid car is known that includes a plurality of power sources. For example, Patent Document 1 discloses a hybrid car including an engine and an electric motor (motor generator). Such a hybrid car can provide so-called regenerative control that converts a kinetic energy of a vehicle with the electric motor into an electric energy to be accumulated during deceleration of the vehicle.

Patent Document 1 discloses a technique for increasing the rotation speed of the electric motor by executing a downshift of a transmission for the purpose of improving the energy regenerative efficiency if the regenerative control is provided when a deceleration request is made in the vehicle.

Patent Document 1: Japanese Laid-Open Patent Publication No. 2007-50866

SUMMARY OF THE INVENTION

Problem to Be Solved by the Invention

Since efficiency of a transmission and a loss in an electric motor vary depending on temperature, even if a downshift of a transmission is executed to increase the rotation speed of the electric motor and improve the energy regenerative efficiency when the regenerative control is provided as described in Patent Document 1, efficiency of an entire power transmission device may problematically deteriorate due to increase in the loss in the electric motor or deterioration in the efficiency of the transmission. Such a problem is not known.

The present invention was conceived in view of the situations and it is therefore an object of the present invention to provide a control device for a vehicle power transmission device capable of improving fuel economy by providing control in consideration of efficiency of an entire vehicle power transmission device when regenerative control is provided.

The object indicated above can be achieved according to a first aspect of the present invention, which provides (a) a control device for a vehicle power transmission device including a shifting portion and an electric motor that provides regeneration via the shifting portion, (b) the control device executing a downshift of the shifting portion if a traveling loss in the vehicle power transmission device after the shift is smaller than a traveling loss in the vehicle power transmission device at a current gear ratio during regenerative traveling.

According to the first aspect of the invention, in the vehicle power transmission device including the electric motor that provides regeneration via the shifting portion, since a downshift of the shifting portion is executed if a traveling loss in the vehicle power transmission device after a shift is smaller than a traveling loss in the vehicle power transmission device at the current gear ratio during the regenerative traveling, the deterioration in traveling loss due to a shift is reduced in the vehicle power transmission device and the fuel economy is improved.

Preferably, the traveling loss in the vehicle power transmission device includes a loss in the shifting portion, and the loss in the shifting portion is calculated based on the operating oil temperature of the shifting portion. Accordingly, the loss in the shifting portion changed based on the oil temperature $T_{OIL}$ of the operating oil can accurately be calculated.

Preferably, the traveling loss in the vehicle power transmission device includes a loss in the electric motor, and the loss in the electric motor is calculated based on the temperature of the electric motor. Accordingly, the loss in the electric motor changed based on the temperature $T_{M2}$ can accurately be calculated.

Preferably, (a) the control device has a regenerative traveling shift map set in accordance with a vehicle speed and a power of the electric motor for executing the shift of the shifting portion during the regenerative traveling, and (b) the control device executes the shift based on the regenerative traveling shift map during the regenerative traveling. Accordingly, the shift of the shifting portion during the regenerative traveling is executed based on the regenerative traveling shift map set in accordance with the vehicle speed and the power of the electric motor; therefore, a determination can be made on the case that a traveling loss in the vehicle power transmission device after the shift is smaller than a traveling loss in the vehicle power transmission device at the current gear ratio based on the regenerative traveling shift map; a downshift of the shifting portion is executed based on the determination; and, as a result, this reduces the deterioration in traveling loss due to a shift in the vehicle power transmission device, improves the fuel economy, and reduces an amount of calculation for determining the shift.

Preferably, (a) the control device has a regenerative traveling shift map set in accordance with a vehicle speed and a torque of the electric motor for executing the shift of the shifting portion during the regenerative traveling, and (b) the control device executes the shift based on the regenerative traveling shift map during the regenerative traveling. Accordingly, the shift of the shifting portion during the regenerative traveling is executed based on the regenerative traveling shift map set in accordance with the vehicle speed and the torque of the electric motor; therefore, a determination can be made on the case that a traveling loss in the power transmission device 10 after the shift is smaller than a traveling loss in the vehicle power transmission device at the current gear ratio based on the regenerative traveling shift map; a downshift of the shifting portion is executed based on the determination; and, as a result, this reduces the deterioration in traveling loss due to a shift in the vehicle power transmission device, improves the fuel economy, and reduces an amount of calculation for determining the shift.

Preferably, a shifting point for executing the downshift of the shifting portion is set in advance depending on the operating oil temperature of the shifting portion such that the downshift of the shifting portion is executed if the traveling loss in the vehicle power transmission device after the shift is smaller than the traveling loss in the vehicle power transmission device at the current gear ratio. Accordingly, the downshift of the shifting portion is executed if a traveling loss in the vehicle power transmission device after the shift is smaller than a traveling loss in the vehicle power transmission device at the current gear ratio based on the shifting point set in advance depending on the operating oil temperature, and this reduces the deterioration in traveling loss due to a shift in the vehicle power transmission device, improves the fuel economy, and reduces an amount of calculation for determining the shift.

Preferably, a shifting point for executing the downshift of the shifting portion is set in advance depending on the temperature of the electric motor such that the downshift of the shifting portion is executed if the traveling loss in the vehicle power transmission device after the shift is smaller than the traveling loss in the vehicle power transmission device at the current gear ratio. Accordingly, the downshift of the shifting portion is executed if a traveling loss in the vehicle power transmission device after the shift is smaller than a traveling loss in the vehicle power transmission device at the current gear ratio based on the shifting point set in advance depending on the temperature of the electric motor relating to the efficiency of the electric motor, and this reduces the deterioration in traveling loss due to a shift in the vehicle power transmission device, improves the fuel economy, and reduces an amount of calculation for determining the shift.

Preferably, (a) the vehicle power transmission device includes a differential portion disposed on a power transmission path from a prime mover to a drive wheel, and (b) the differential portion includes a first electric motor and a second electric motor coupled in a power transmittable manner to two respective rotating elements among rotating elements of the differential portion. This enables the regenerative control to be provided during deceleration of a vehicle by both or one of the first electric motor and the second electric motor coupled in a power transmittable manner to the rotating elements, respectively, of the differential portion.

Preferably, (a) the differential portion includes a first element coupled to the prime mover, a second element coupled to the first electric motor, and a third element coupled to a transmitting member that transmits the output of the differential portion to the shifting portion, and (b) the second electric motor is coupled to the third element. Accordingly, the regenerative output can be generated by both or one of the first electric motor and the second electric motor coupled via the differential portion. By controlling the operation states of the first electric motor and the second electric motor, the differential state of the differential portion can be changed and the differential portion can be operated as a stepless transmission capable of continuously varying the gear ratio.

Preferably, (a) the control device has a regenerative traveling shift map set in accordance with a vehicle speed and a power of the second electric motor for executing the shift of the shifting portion during the regenerative traveling, and (b) the control device executes the shift based on the regenerative traveling shift map during the regenerative traveling. Accordingly, the regenerative power from the second electric motor is reduced; and even if an amount of reduction is small in the loss in the electric motor at the time of downshift, the shift of the shifting portion can be executed.

Preferably, (a) the control device has a regenerative traveling shift map set in accordance with a vehicle speed and a torque of the second electric motor for executing the shift of the shifting portion during the regenerative traveling, and (b) the control device executes the shift based on the regenerative traveling shift map during the regenerative traveling. Accordingly, the regenerative torque from the second electric motor is reduced; and even if an amount of reduction is small in the loss in the electric motor at the time of downshift, the shift of the shifting portion can be executed.

More preferably, the shifting portion is a mechanical stepped transmission. Accordingly, the shifting portion is a stepped transmission capable of varying the gear ratio in a stepped manner and, therefore, in addition to the above-indicated effect, when an amount of change is increased in the gear ratio of the shifting portion, an increase in size of the shifting portion can be suppressed.

Preferably, the loss in the first electric motor or the second electric motor includes a loss in an inverter related to the drive of the first electric motor or the second electric motor. Accordingly, the loss in the inverter related to the drive of the first electric motor or the second electric motor is taken into consideration when the traveling loss in the vehicle power transmission device is calculated, and the traveling loss in the vehicle power transmission device is accurately calculated.

NOMENCLATURE OF ELEMENTS

Figure 1:
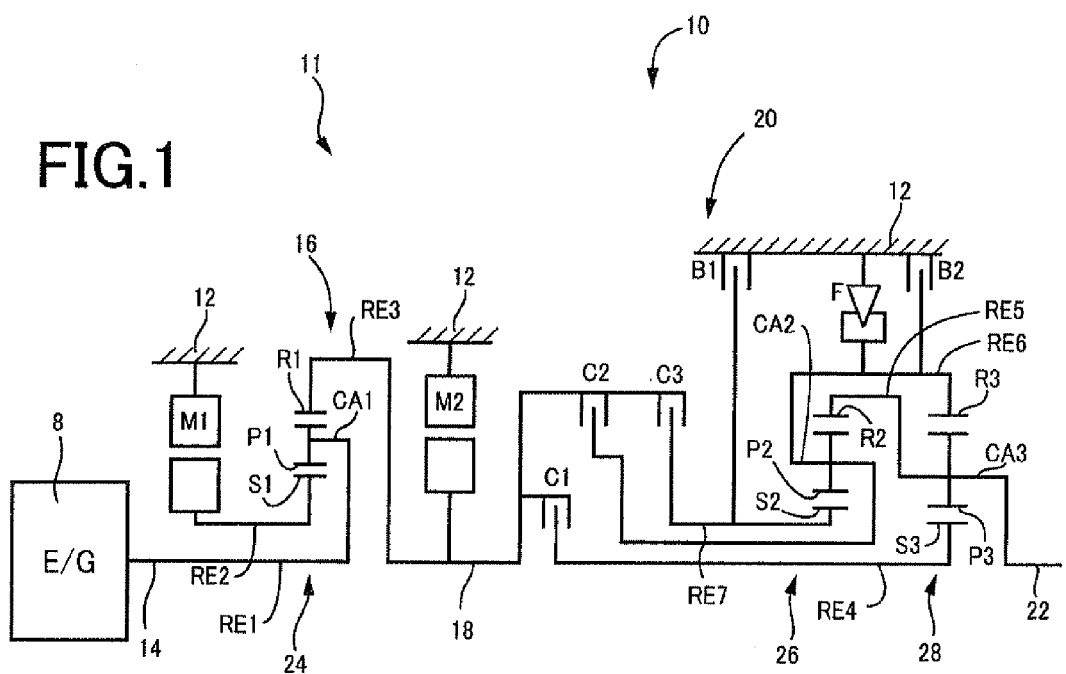
FIG. 1 is a schematic for explaining an example of the structure of a vehicle power transmission device to which the present invention is applied.

8: engine (prime mover)
10: vehicle power transmission device
16: power distribution mechanism (differential portion)
20: automatic shifting portion (stepped shifting mechanism)
24: first planetary gear device (planetary gear device)
100: electronic control device (control device for a vehicle power transmission device)
110: regenerative—period shift determining means
112: vehicle state determining means
114: loss comparing means
116: shift map storage means
118: loss calculating means
120: electric motor loss calculating means
122: inverter loss calculating means
124: automatic shifting portion loss calculating means
M1: first electric motor (electric motor)
M2: second electric motor (electric motor)
Best Modes For Carrying Out The Invention Embodiments of the present invention will now be described in detail with reference to the drawings.
First Embodiment FIG. 1 is a schematic for explaining a vehicle power transmission device (hereinafter, simply the "power transmission device") 10 making up a portion of a drive device of a hybrid vehicle to which the present invention is applied. In FIG. 1, the power transmission device 10 includes, in series, an input shaft 14 as an input rotating member disposed on a common shaft center in a transmission case 12 (hereinafter, the case 12) that is a non-rotating member attached to a vehicle body; a differential portion 11 as a stepless shifting portion coupled to the input shaft 14 directly or indirectly via a pulsation absorbing damper (pulsation damping device) not depicted; an automatic shifting portion 20 as a power transmitting portion serially coupled via a transmitting member 18 on a power transmission path from the differential portion 11 to drive wheels 38 (see FIG. 6); and an output shaft 22 as an output rotating member coupled to the automatic shifting portion 20. The power transmission device 10 is preferably used for, for example, an FR (front-engine rear-drive) type vehicle with the power transmission device 10 longitudinally placed in the vehicle, and is disposed between an engine (prime mover) 8 that is, for example, an internal combustion engine such as a gasoline engine or a diesel engine as a drive force source for traveling coupled to the input shaft 14 directly or directly via the pulsation absorbing damper not depicted and a pair of the drive wheels 38 (see FIG. 6) to transmit the power from the engine 8 sequentially through a differential gear device (final reduction device) 36 (see FIG. 6) making up a portion of the power transmission path and a pair of axles etc., to a pair of the drive wheels 38. The automatic shifting portion 20 of this embodiment corresponds to a shifting portion of the present invention. The power transmission device 10 has a substantially vertically symmetric configuration and the lower half is not depicted in FIG. 1.

In the power transmission device 10 of this embodiment, the engine 8 is directly coupled to the differential portion 11. This direct coupling means that the coupling is achieved without the intervention of a fluid type power transmission device such as a torque converter or a fluid coupling and this coupling includes, for example, a coupling through the pulsation absorbing damper.

The differential portion 11 includes a first electric motor M1, a power distribution mechanism 16 that is a mechanical mechanism mechanically distributing the output of the engine 8 coupled to the input shaft 14 as a differential mechanism distributing the output of the engine 8 to the first electric motor M1 and the transmitting member 18, and a second electric motor M2 operatively coupled to rotate integrally with the transmitting member 18. Although the first electric motor M1 and the second electric motor M2 of this embodiment are so-called motor generators that have an electric generation function, the first electric motor M1 at least includes a generator (electric generation) function for generating a reaction force and the second electric motor M2 at least includes a motor (electric motor) function for outputting a drive force as a drive source for traveling. The power distribution mechanism 16 of this embodiment corresponds to a differential portion of the present invention. The first electric motor M1 and the second electric motor M2 correspond to electric motors of the present invention.

The power distribution mechanism 16 is made up mainly of a single pinion type first planetary gear device 24 having a predetermined gear ratio ρ1. The first planetary gear device 24 includes a first sun gear S1, a first planetary gear P1, a first carrier CA1 that supports the first planetary gear P1 in a rotatable and revolvable manner, and a first ring gear R1 engaging with the first sun gear S1 via the first planetary gear P1, as rotating elements. When ZS1 denotes the number of teeth of the first sun gear S1 and ZR1 denotes the number of teeth of the first ring gear R1, the gear ratio ρ1 is ZS1/ZR1.

In this power distribution mechanism 16, the first carrier CA1 is coupled to the input shaft 14, i.e., the engine 8 to make up a first rotating element RE1; the first sun gear S1 is coupled to the first electric motor M1 to make up a second rotating element RE2; and the first ring gear R1 is coupled to the transmitting member 18 to make up a third rotating element RE3. The power distribution mechanism 16 configured as described above is put into a differential state where a differential action is made operative, i.e., the differential action is achieved by enabling the three elements of the first planetary gear device 24, i.e., the first sun gear S1, the first carrier CA1, and the first ring gear R1 to rotate relative to each other and, therefore, the output of the engine 8 is distributed to the first electric motor M1 and the transmitting member 18, and since the electric energy generated by the first electric motor M1 from a portion of the distributed output of the engine 8 is accumulated and used for rotationally driving the second electric motor M2, the differential portion 11 (the power distribution mechanism 16) is allowed to function as an electric differential device and, for example, the differential portion 11 is put into a so-called stepless shifting state, and the rotation of the transmitting member 18 is continuously varied regardless of a predetermined rotation of the engine 8. Therefore, the differential portion 11 functions as an electric stepless transmission with a gear ratio γ0 (rotation speed $N_{IN}$ of the input shaft 14/rotation speed $N_{18}$ of the transmitting member 18) continuously varied from a minimum value γ0 min to a maximum value γ0 max.

The automatic shifting portion 20 is disposed on the power transmission path from the transmitting member 18 to the drive wheels 38, includes a single pinion type second planetary gear device 26 and a single pinion type third planetary gear device 28, and is a planetary-gear type multistage transmission acting as a stepped automatic transmission. The second planetary gear device 26 includes a second sun gear S2, a second planetary gear P2, a second carrier CA2 that supports the second planetary gear P2 in a rotatable and revolvable manner, and a second ring gear R2 engaging with the second sun gear S2 via the second planetary gear P2 and has a predetermined gear ratio ρ2. The third planetary gear device 28 includes a third sun gear S3, a third planetary gear P3, a third carrier CA3 that supports the third planetary gear P3 in a rotatable and revolvable manner, and a third ring gear R3 engaging with the third sun gear S3 via the third planetary gear P3 and has a predetermined gear ratio ρ3. When ZS2, ZR2, ZS3, and ZR3 respectively denote the number of teeth of the second sun gear S2, the number of teeth of the second ring gear R2, the number of teeth of the third sun gear S3, and the number of teeth of the third ring gear R3, the gear ratio ρ2 is ZS2/ZR2 and the gear ratio ρ3 is ZS3/ZR3.

In the automatic shifting portion 20, the second sun gear S2 is coupled to the transmitting member 18 via a third clutch C3 and is selectively coupled to the case 12 via a first brake B1; the second carrier CA2 and the third ring gear R3 are integrally coupled to each other, are coupled to the transmitting member 18 via a second clutch C2, and are selectively coupled to the case 12 via a second brake B2; the second ring gear R2 and the third carrier CA3 are integrally coupled to each other and are coupled to the output shaft 22; and the third sun gear S3 is selectively coupled to the transmitting member 18 via a first clutch C1. The second carrier CA2 and the third ring gear R3 are coupled to the case 12 that is a non-rotating member via a unidirectional clutch F to allow rotation in the same direction as the engine 8 and to prohibit rotation in the opposite direction. As a result, the second carrier CA2 and the third ring gear R3 act as rotating members unable to rotate reversely.

In the automatic shifting portion 20, a clutch-to-clutch shift is executed by the release of release-side engagement devices and the engagement of engagement-side engagement devices and a plurality of gear stages (shift stages) are selectively established to acquire a gear ratio γ (=rotation speed $N_{18}$ of the transmitting member 18/rotation speed $N_{OUT}$ of the output shaft 22) varying in substantially equal ratio for each gear stage. For example, as depicted in an engagement operation table of FIG. 2, a first speed gear stage is established by the engagement of the first clutch C1 and the unidirectional clutch F; a second speed gear stage is established by the engagement of the first clutch C1 and the first brake B1; a third speed gear stage is established by the engagement of the first clutch C1 and the second clutch C2; a fourth speed gear stage is established by the engagement of the second clutch C2 and the first brake B1; and a reverse gear stage is established by the engagement of the third clutch C3 and the second brake B2. A neutral "N" state is achieved by the release of the first clutch C1, the second clutch C2, the third clutch C3, the first brake B1, and the second brake B2. At the time of engine braking in the first speed gear stage, the second brake B2 is engaged.

The power transmission path in the automatic shifting portion 20 is switched between a power transmittable state that enables the power transmission through the power transmission path and a power transmission interrupting state that interrupts the power transmission in accordance with a combination of the engagement and release operations of the first clutch C1, the second clutch C2, the third clutch C3, the first brake B1, and the second brake B2. When any one of the first to fourth speed gear stages and the reverse gear stage is established, the power transmission path is put into the power transmittable state and when no gear stage is established, for example, when the neutral "N" state is established, the power transmission path is put into the power transmission interrupting state.

The first clutch C1, the second clutch C2, the third clutch C3, the first brake B1, and the second brake B2 (hereinafter, simply, clutches C and brakes B if not particularly distinguished) are hydraulic friction engagement devices acting as engagement elements frequently used in conventional vehicle automatic transmissions and are made up as a wet multi-plate type having a hydraulic actuator pressing a plurality of friction plates overlapped with each other or as a band brake having a hydraulic actuator fastening one end of one or two bands wrapped around an outer peripheral surface of a rotating drum, for the purpose of selectively coupling members on the both sides of the devices interposed therebetween. The oil pressure supplied for actuating the clutches C and the brakes B of this embodiment into the engaged state corresponds to an engagement oil pressure of the present invention.

In the power transmission device 10 configured as described above, a stepless transmission is made up of the differential portion 11 functioning as a stepless transmission and the automatic shifting portion 20. The differential portion 11 and the automatic shifting portion 20 can form the state equivalent to a stepped transmission by providing control such that the gear ratio of the differential portion 11 is kept constant.

Specifically, when the differential portion 11 functions as a stepless transmission and the automatic shifting portion 20 in series with the differential portion 11 functions as a stepped transmission, the rotation speed input to the automatic shifting portion 20 (hereinafter, input rotation speed of the automatic shifting portion 20), i.e., the rotation speed of the transmitting member 18 (hereinafter, transmitting member rotation speed $N_{18}$) is varied in a stepless manner for at least one gear stage M of the automatic shifting portion 20, and a stepless gear ratio width is acquired in the gear stage M. Therefore, a general gear ratio γT (=rotation speed $N_{IN}$ of the input shaft 14/rotation speed $N_{OUT}$ of the output shaft 22) of the power transmission device 10 is acquired in a stepless manner and a stepless transmission is formed in the power transmission device 10. The general gear ratio γT of the power transmission device 10 is a total gear ratio γT of the entire power transmission device 10 generated based on the gear ratio γ0 of the differential portion 11 and the gear ratio γ of the automatic shifting portion 20.

Figures 2, 3:
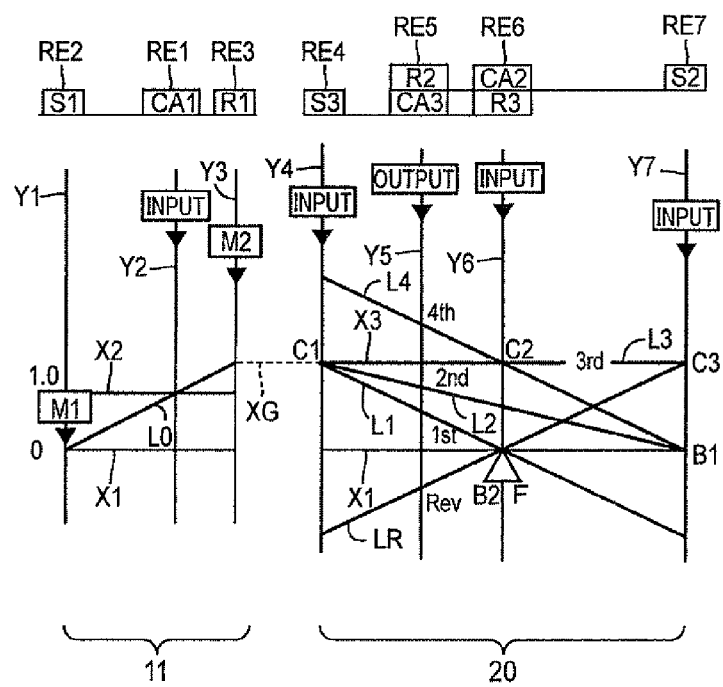
FIG. 2 is an engagement operation table for explaining the relationship of the shifting operation in the automatic shifting portion of the vehicle power transmission device and the combination of the operation of hydraulic frictional engaging device used for it
FIG. 3 is a collinear diagram for explaining the relative rotation speed of each gear stage upon the stepped shifting operation of the vehicle power transmission device of FIG. 1.

For example, the transmitting member rotation speed $N_{18}$ is varied in a stepless manner for each gear stage of the first to fourth speed gear stages and the reverse gear stage of the automatic shifting portion 20 described in the engagement operation table of FIG. 2 and a stepless gear ratio width is acquired in each gear stage. Therefore, a gear ratio continuously variable in a stepless manner is achieved between the gear stages and the total gear ratio γT is acquired in a stepless manner for the entire power transmission device 10.

When the gear ratio of the differential portion 11 is controlled to be kept constant and the clutches C and the brakes B are selectively engaged and actuated to selectively establish any one of the first to fourth speed gear stages or the reverse gear stage (reverse shift stage), the total gear ratio γT of the power transmission device 10 varying in substantially equal ratio is acquired for each gear stage. Therefore, the state equivalent to a stepped transmission is formed in the power transmission device 10.

FIG. 3 depicts a collinear diagram capable of representing on straight lines the relative relationships of the rotation speeds of the rotating elements having a different coupling state for each gear stage in the power transmission device 10 made up of the differential portion 11 and the automatic shifting portion 20. The collinear diagram of FIG. 3 represents two-dimensional coordinates defined by a horizontal axis indicative of a relationship of the gear ratios ρ of the planetary gear devices 24, 26, and 28 and a vertical axis indicative of a relative rotation speed and, a lower horizontal line X1 of three horizontal lines indicates a zero rotation speed; an upper horizontal line X2 indicates a rotation speed "1.0", i.e., a rotation speed $N_E$ of the engine 8 coupled to the input shaft 14; and X3 indicates a rotation speed of the third rotating element RE3 described later input from the differential portion 11 to the automatic shifting portion 20.

Three vertical lines Y1, Y2, and Y3 corresponding to the three elements of the power distribution mechanism 16 making up the differential portion 11 indicate relative rotation speeds of the first sun gear S1 corresponding to the second rotating element RE2, the first carrier CA1 corresponding to the first rotating element RE1, and the first ring gear R1 corresponding to the third rotating element RE3 in the order from left to right, and the intervals between the lines are determined depending on the gear ratio ρ1 of the first planetary gear device 24. Four vertical lines Y4, Y5, Y6, and Y7 of the automatic shifting portion 20 respectively represents the third sun gear S3 corresponding to a fourth rotating element RE4, the second ring gear R2 and the third carrier CA3 mutually-coupled and corresponding to a fifth rotating element RE5, the second carrier CA2 and the third ring gear R3 mutually-coupled and corresponding to a sixth rotating element RE6, and the second sun gear S2 corresponding to a seventh rotating element RE7 in the order from left to right, and the intervals between the lines are determined respectively depending on the gear ratios ρ2 and ρ3 of the second and third planetary gear devices 26 and 28. In the relationship between the vertical axes of the collinear diagram, when an interval corresponding to "1" is defined between a sun gear and a carrier, an interval corresponding to the gear ratio ρ of a planetary gear device is defined between the carrier and a ring gear. Therefore, in the case of the differential portion 11, the interval corresponding to "1" is set between the vertical lines Y1 and Y2, and the interval between the vertical lines Y2 and Y3 is set to the interval corresponding to the gear ratio ρ1. In the case of the automatic shifting portion 20, the interval corresponding to "1" is set between the sun gear and the carrier of each of the second and third planetary gear devices 26 and 28, and the interval corresponding to p is set between the carrier and the ring gear.

When the power transmission device 10 of this embodiment is represented by using the collinear diagram of FIG. 3, the first rotating element RE1 (the first carrier CA1) of the first planetary gear device 24 is coupled to the input shaft 14, i.e., the engine 8 in the power distribution mechanism 16 (the differential portion 11); the second rotating element RE2 is coupled to the first electric motor M1; the third rotating element (the first ring gear R1) RE3 is coupled to the transmitting member 18 and the second electric motor M2; and the rotation of the input shaft 14 is configured to be transmitted (input) via the transmitting member 18 to the automatic shifting portion 20. A diagonal straight line L0 passing through the intersection point of Y2 and X2 indicates the relationship between the rotation speed of the first sun gear S1 and the rotation speed of the first ring gear R1.

For example, the differential portion 11 is put into a differential state where the first rotating element RE1 to the third rotating element RE3 are enabled to rotate relative to each other and, if the rotation speed of the first ring gear R1 indicated by the intersecting point between the line L0 and the vertical line Y3 is restricted and kept substantially constant by the vehicle speed V, when the rotation speed of the first electric motor M1 is controlled to increase or decrease the rotation of the first sun gear S1 indicated by the intersecting point between the line L0 and the vertical line Y1, the rotation speed of the first carrier CA1 indicated by the intersecting point between the line L0 and the vertical line Y2, i.e., the engine rotation speed $N_E$ is increased or decreased.

When the rotation speed of the first electric motor M1 is controlled such that the gear ratio γ0 of the differential portion 11 is fixed to "1" to set the rotation of the first sun gear S1 to the same rotation as the engine rotation speed $N_E$, the line L0 is matched to the horizontal line X2, and the rotation speed of the first ring gear R1, i.e., the transmitting member 18 is rotated at the same rotation as the engine rotation speed $N_E$. Alternatively, when the rotation speed of the first electric motor M1 is controlled such that the gear ratio γ0 of the differential portion 11 is fixed to a value smaller than "1", for example, about 0.7 to set the rotation of the first sun gear S1 to zero, the line L0 is put into the state depicted in FIG. 3, and the transmitting member 18 is rotated at a speed increased from the engine rotation speed $N_E$.

In the automatic shifting portion 20, the fourth rotating element RE4 is selectively coupled to the transmitting member 18 via the first clutch C1; the fifth rotating element RE5 is coupled to the output shaft 22; the sixth rotating element RE6 is selectively coupled to the transmitting member 18 via the second clutch C2 and also selectively coupled to the case 12 via the second brake B2; and the seventh rotating element RE7 is selectively coupled to the transmitting member 18 via the third clutch C3 and also selectively coupled to the case 12 via the first brake B1.

In the automatic shifting portion 20, for example, when the rotation speed of the first electric motor M1 is controlled to set the rotation speed of the first sun gear S1 to substantially zero in the differential portion 11, the line L0 is put into the state depicted in FIG. 3, and the rotation speed is increased from the engine rotation speed $N_E$ and output to the third rotating element RE3. As depicted in FIG. 3, when the first clutch C1 and the second brake B2 are engaged, the rotation speed of the output shaft 22 at a first speed is indicated by the intersecting point between a diagonal straight line L1 that passes through the intersecting point between the vertical line Y4 indicative of the rotation speed of the fourth rotating element RE4 and the horizontal line X3 and the intersecting point between the vertical line Y6 indicative of the rotation speed of the sixth rotating element RE6 and the horizontal line X1, and the vertical line Y5 indicative of the rotation speed of the fifth rotating element RE5 coupled to the output shaft 22. Similarly, the rotation speed of the output shaft 22 at a second speed is indicated by the intersecting point between a diagonal straight line L2 determined by engaging the first clutch C1 and the first brake B1 and the vertical line Y5 indicative of the rotation speed of the fifth rotating element RE5 coupled to the output shaft 22; the rotation speed of the output shaft 22 at a third speed is indicated by the intersecting point between a horizontal straight line L3 determined by engaging the first clutch C1 and the second clutch C2 and the vertical line Y5 indicative of the rotation speed of the fifth rotating element RE5 coupled to the output shaft 22; and the rotation speed of the output shaft 22 at a fourth speed is indicated by the intersecting point between a diagonal straight line L4 determined by engaging the second clutch C2 and the first brake B1 and the vertical line Y5 indicative of the rotation speed of the fifth rotating element RE5 coupled to the output shaft 22.

Figure 4:
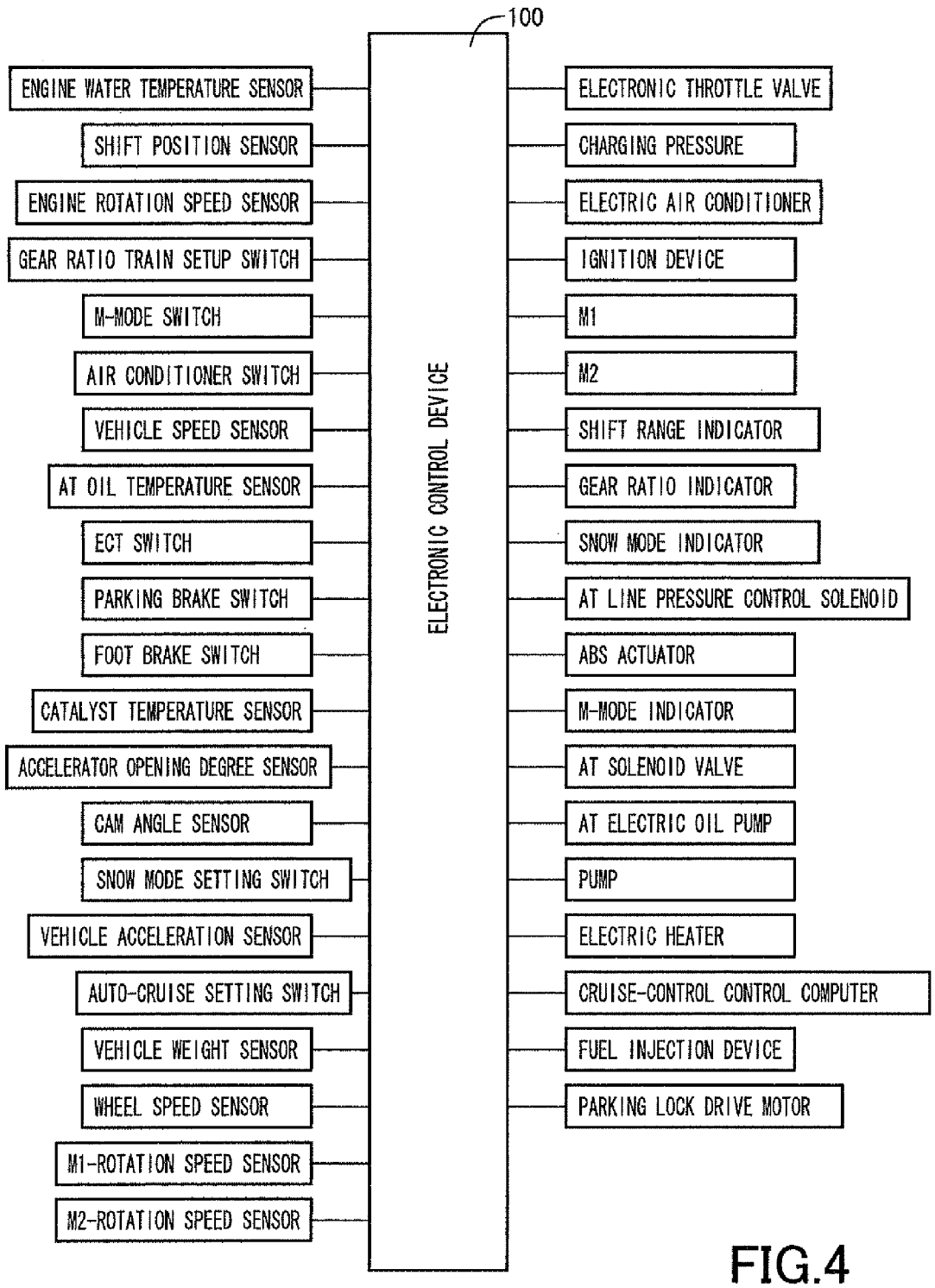
FIG. 4 is a diagram for explaining input and output signals of the electronic control device provided in the vehicle power transmission device of FIG. 1.

FIG. 4 exemplarily illustrates signals input to an electronic control device 100 for controlling the power transmission device 10 of this embodiment and signals output from the electronic control device 100. The electronic control device 100 includes a so-called microcomputer made up of CPU, ROM, RAM, I/O interface, etc., and executes signal processes in accordance with programs stored in advance in the ROM, while utilizing a temporary storage function of the RAM, to provide drive controls such as the hybrid drive control related to the engine 8 and the first and second electric motors M1 and M2 and the shift control of the automatic shifting portion 20.

The electronic control device 100 is supplied, from respective sensors, switches, etc., as depicted in FIG. 4, with a signal indicative of an engine water temperature $TEMP_W$, signals indicative of a shift position $P_{SH}$ of a shift lever 52 (see FIG. 5) and the number of operations at an "M" position, a signal indicative of the engine rotation speed $N_E$ that is the rotation speed of the engine 8, a signal indicative of a gear ratio train setup value; a signal giving a command for an M-mode (manual shift traveling mode), a signal indicative of an operation state AIC of an air conditioner, a signal indicative of a vehicle speed V corresponding to the rotation speed (hereinafter, output shaft rotation speed) $N_{OUT}$ of the output shaft 22, a signal indicative of an operating oil temperature $T_{OIL}$ of the automatic shifting portion 20, a signal indicative of a parking brake operation, a signal indicative of a foot brake operation, a signal indicative of a catalyst temperature, a signal indicative of an accelerator opening degree Acc that is an amount of an accelerator pedal operation corresponding to an output request amount of a driver, a signal indicative of a cam angle, a signal indicative of a snow mode setup, a signal indicative of longitudinal acceleration G of a vehicle, a signal indicative of auto-cruise travelling, a signal indicative of a weight of a vehicle (vehicle weight), a signal indicative of a wheel speed for each of wheels, a signal indicative of a rotation speed $N_{M1}$ (hereinafter, first electric motor rotation speed $N_{M1}$) of the first electric motor M1, a signal indicative of a rotation speed $N_{M2}$ (hereinafter, second electric motor rotation speed $N_{M2}$) of the second electric motor M2, a signal indicative of a temperature $T_{M2}$ of the second electric motor M2, a signal indicative of a charging capacity (charging state) SOC of an electric storage device 60 (see FIG. 6), etc.

The electronic control device 100 outputs respective control signals to an engine output control device 43 (see FIG. 6) that controls engine output, for example, a drive signal to a throttle actuator 97 that operates a throttle valve opening degree $θ_{TH}$ of an electronic throttle valve 96 disposed in an induction pipe 95 of the engine 8, a fuel supply amount signal that controls a fuel supply amount into the induction pipe 95 or the cylinders of the engine 8 from a fuel injection device 98, an ignition signal that gives a command for the timing of the ignition of the engine 8 by an ignition device 99, a charging pressure adjusting signal for adjusting a charging pressure, an electric air conditioner drive signal for activating an electric air conditioner, command signals that gives commands for the operations of the electric motors M1 and M2, a shift position (operational position) display signal for activating a shift indicator, a gear ratio display signal for displaying a gear ratio, a snow mode display signal for displaying that the snow mode is in operation, an ABS activation signal for activating an ABS actuator that prevents wheels from slipping at the time of braking, an M-mode display signal for displaying that the M-mode is selected, a valve command signal for activating an electromagnetic valve (linear solenoid valve) included in a hydraulic control circuit 42 (see FIG. 6) so as to control the hydraulic actuator of the hydraulic friction engagement devices of the differential portion 11 and the automatic shifting portion 20, a signal for regulating a line oil pressure $P_L$ with a regulator valve (pressure regulating valve) disposed in the hydraulic control circuit 42, a drive command signal for activating an electric hydraulic pump that is an oil pressure source of an original pressure for regulating the line oil pressure $P_L$, a signal for driving an electric heater, a signal to a computer for controlling the cruise control, a signal for driving a parking lock drive motor, etc.

Figure 5:
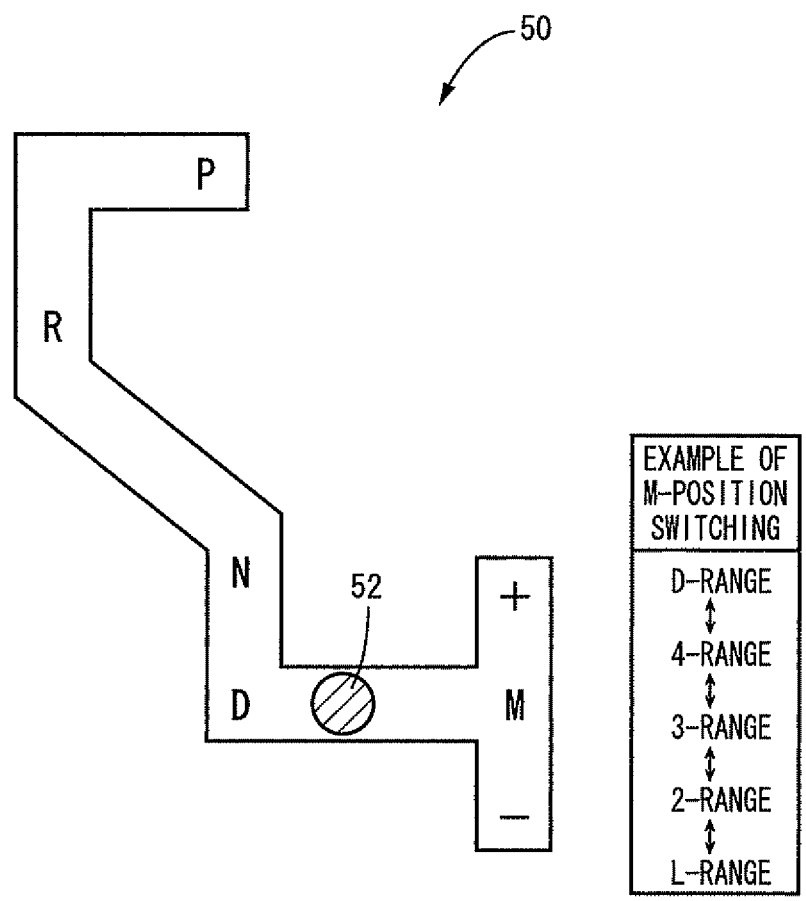
FIG. 5 is a diagram of an example of a shift operation device for switching a plurality of types of shift positions with a shift lever.

FIG. 5 is a diagram of an example of a shift operation device 50 as a switching device that switches a plurality of types of shift positions $P_{SH}$ through artificial manipulation. The shift operation device 50 is disposed next to a driver's seat, for example, and includes the shift lever 52 operated so as to select a plurality of types of the shift positions $P_{SH}$.

The shift lever 52 is arranged to be manually operated to a parking position "P (parking)" for being in a neutral state, i.e., neutral state with the power transmission path interrupted in the power transmission device 10, i.e., in the automatic shifting portion 20 and for fixing in a non-rotatable manner (i.e., locking) the output shaft 22 of the automatic shifting portion 20; a backward traveling position "R (reverse)" for backward traveling; a neutral position "N (neutral)" for being in the neutral state with the power transmission path interrupted in the power transmission device 10; a forward automatic transmission traveling position "D (drive)" for achieving an automatic transmission mode to provide the automatic transmission control within an available variation range of the total gear ratio γT of the power transmission device 10 acquired from a stepless gear ratio width of the differential portion 11 and the gear stages subjected to the automatic transmission control within the range of the first speed gear stage to the fourth speed gear stage of the automatic shifting portion 20; or a forward manual transmission traveling position "M (manual)" for achieving a manual transmission traveling mode (manual mode) to set a so-called shift range that limits shift stages on the high-speed side in the automatic shifting portion 20.

A hydraulic control circuit is electrically switched by, for example, a so-called shift-by-wire system that switches the power transmission state of the power transmission device 10 through electric control such that the reverse gear stage "R", the neutral "N", the shift stages in the forward gear stage "D", etc., described in the engagement operation table of FIG. 2 are established in conjunction with the manual operation of the shift lever 52 to the shift positions $P_{SH}$.

Among the shift positions $P_{SH}$ indicated by the "P" to "M" positions, the "P" position and the "N" position are the non-traveling positions selected when a vehicle is not allowed to travel and are the non-driving positions for selecting the switch-over to the power transmission interrupting state of the power transmission path such that a vehicle with the power transmission path interrupted in the automatic shifting portion 20 cannot be driven. The "R" position, the "D" position, and the "M" position are the travelling positions selected when a vehicle is allowed to travel and are the driving positions for selecting the switch-over to the power transmittable state of the power transmission path such that a vehicle with the power transmission path coupled in the automatic shifting portion 20 can be driven.

Specifically, when the shift lever 52 is manually operated to the "P" position, all the clutches C and the brakes B are released to put the power transmission path in the automatic shifting portion 20 into the power transmission interrupting state and the output shaft 22 of the automatic shifting portion 20 is locked; when the shift lever 52 is manually operated to the "N" position, all the clutches C and the brakes B are released to put the power transmission path in the automatic shifting portion 20 into the power transmission interrupting state; and when the shift lever 52 is manually operated to one of the "R", "D", and "M" positions, one gear stage corresponding to the position is established to put the power transmission path in the automatic shifting portion 20 into the power transmittable state.

Figure 6:
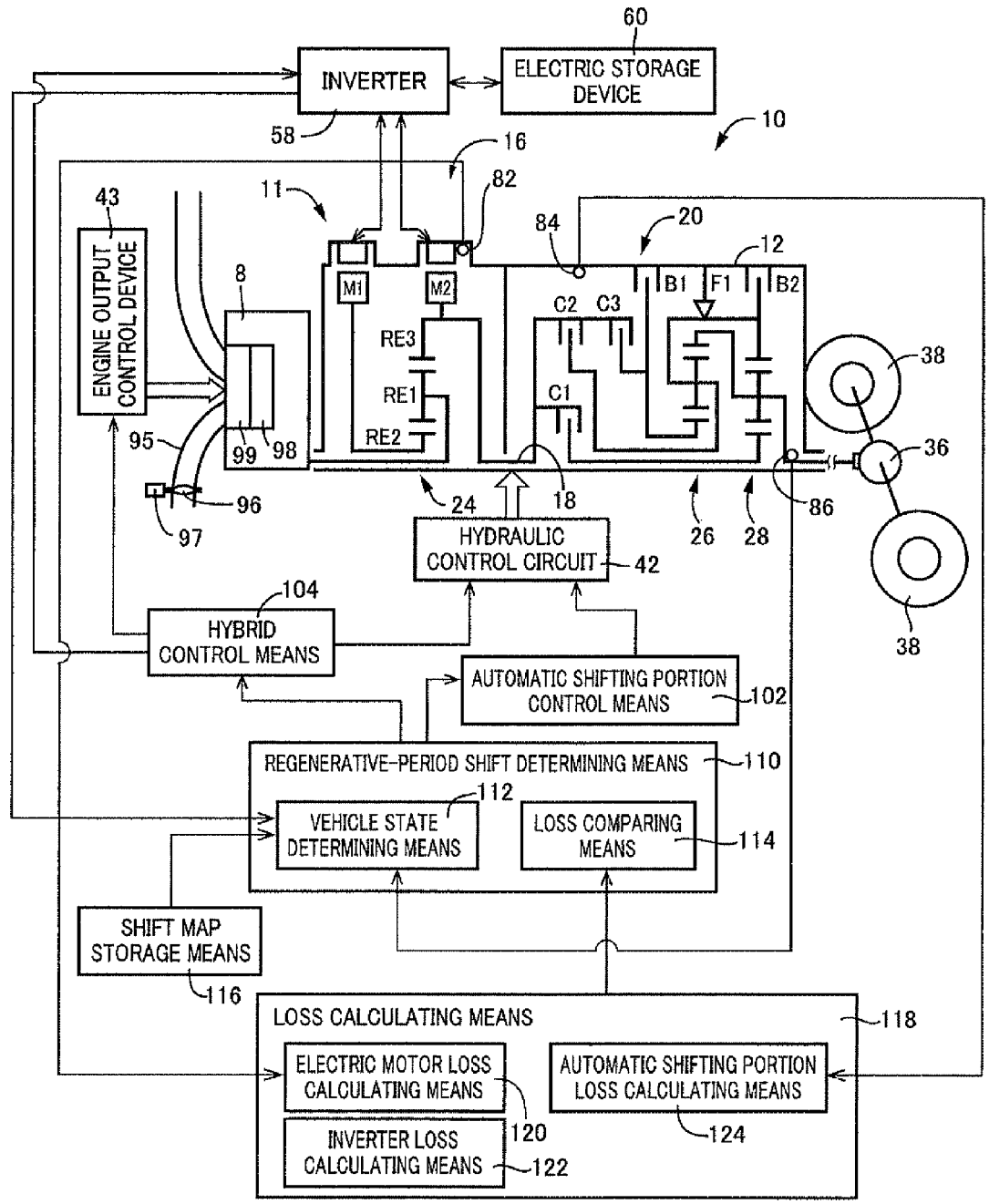
FIG. 6 is a functional block line diagram for explaining the essentials of the control function of the electronic control device of FIG. 4.
Figure 7:
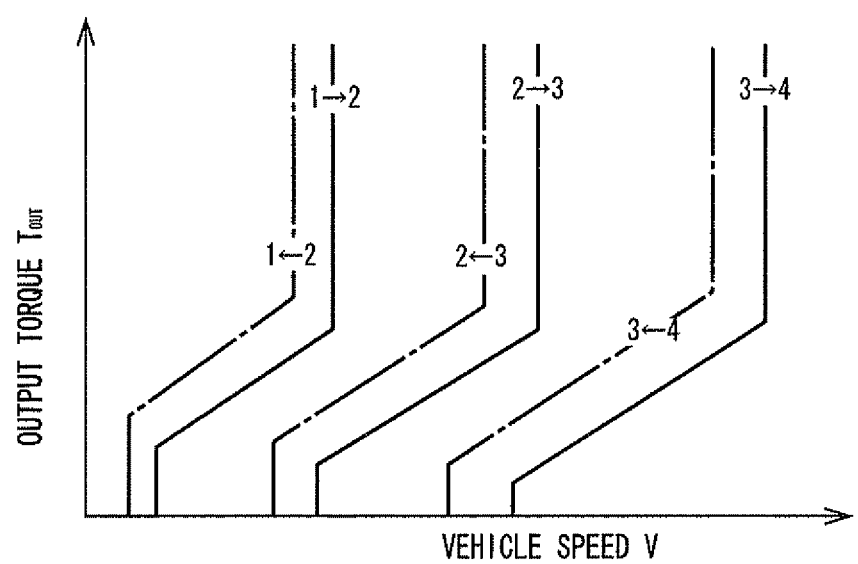
FIG. 7 is an example of the shift line diagram used in the shifting control of the automatic shifting portion.

FIG. 6 is a functional block line diagram for explaining a control function of a control device for the power transmission device 10, which is a portion of the control function of the electronic control device 100. In FIG. 6, an automatic shifting portion control means 102 determines whether a shift of the automatic shifting portion 20 should be executed, i.e., determines a shift stage to be achieved by the shift of the automatic shifting portion 20 based on the vehicle state indicated by an actual vehicle speed V and a request output torque $T_{OUT}$ of the automatic shifting portion 20 in accordance with a relationship (a shifting line diagram, a shift map) having upshift lines (solid lines) and downshift lines (dashed lines) preliminarily stored using the vehicle speed V and the output torque $T_{OUT}$ of the automatic shifting portion 20 as parameters as depicted in FIG. 7, and performs the automatic transmission control of the automatic shifting portion 20 so as to acquire the determined shift stage.

In this case, the automatic shifting portion control means 102 gives a command (a shift output command, an oil pressure command) for engaging and/or releasing the hydraulic friction engagement devices involved in the shift of the automatic shifting portion 20 such that the shift stage is achieved in accordance with, for example, the engagement operation table depicted in FIG. 2, i.e., activates the linear solenoid valve in the hydraulic control circuit 42 to actuates the hydraulic actuator of the hydraulic friction engagement devices involved in the shift such that the shift of the automatic shifting portion 20 is executed by releasing the release-side engagement devices involved in the shift of the automatic shifting portion 20 and engaging the engagement-side engagement devices.

While operating the engine 8 in an efficient operation range, the hybrid control means 104 changes the drive power distribution between the engine 8 and the second electric motor M2 and the reaction force due to the electric generation by the first electric motor M1 to the optimum state to control the gear ratio Y0 of the differential portion 11 acting as an electric stepless transmission. For example, for a traveling vehicle speed V at a time point, a target output of a vehicle is calculated from the accelerator opening degree Acc that is an output request amount of a driver and the vehicle speed V; a necessary total target output is calculated from the target output and a charge request amount of the vehicle; and a target engine output is calculated such that the total target output is acquired in consideration of a transmission loss, an assist torque of the second electric motor M2, etc., to control the engine 8 and control an electric generation amount of the first electric motor M1 so as to achieve the engine rotation speed $N_E$ and the engine torque $T_E$ for acquiring the target engine output.

Figure 8:
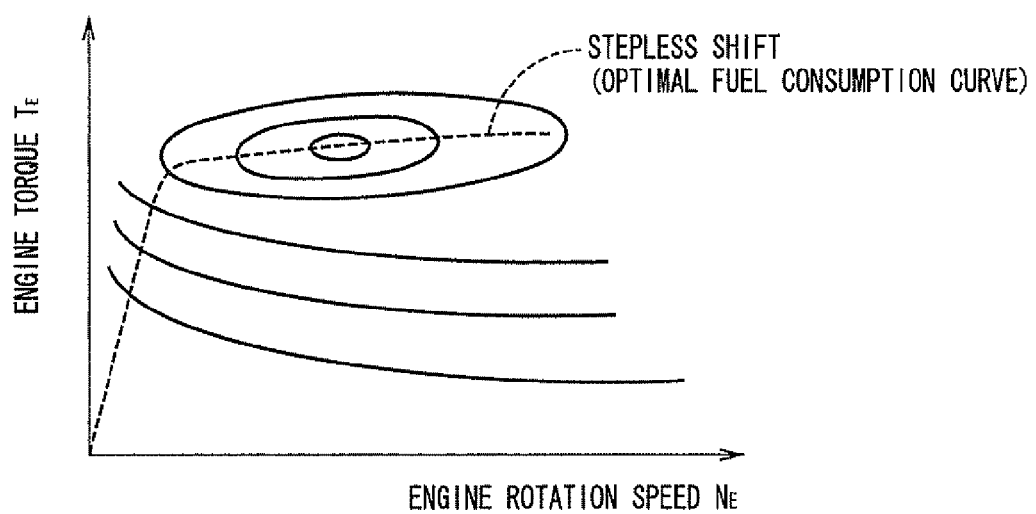
FIG. 8 is an example of the fuel consumption rate map representing the efficiency of the engine, and the broken line depicts the optimal fuel consumption rate curve of the engine.

For example, the hybrid control means 104 provides the control in consideration of the gear stages of the automatic shifting portion 20 for the purpose of improvements of power performance and fuel efficiency. In such hybrid control, the differential portion 11 is driven to function as an electric stepless transmission to match the engine rotation speed $N_E$ determined for operating the engine 8 in an efficient operation range with the rotation speed of the transmitting member 18 determined by the vehicle speed V and the shift stages of the automatic shifting portion 20. Therefore, the hybrid control means 104 determines a target value of the total gear ratio γT of the power transmission device 10 such that the engine 8 is operated along an optimal fuel consumption rate curve of the engine 8 represented by a broken line of FIG. 8 empirically obtained and stored in advance so as to satisfy both the drivability and the fuel consumption property during travelling with stepless transmission in the two-dimensional coordinates made up of the engine rotation speed $N_E$ and the output torque (engine torque) $T_E$ of the engine 8, for example, such that the engine torque $T_E$ and the engine rotation speed $N_E$ are achieved for generating the engine output necessary for satisfying the target output, and the hybrid control means 104 controls the gear ratio 70 of the differential portion 11 in consideration of the gear stages of the automatic shifting portion 20 and controls the total gear ratio γ0 within the available variation range to acquire the target value.

In this case, since the hybrid control means 104 supplies the electric energy generated by the first electric motor M1 to the electric storage device 60 and the second electric motor M2 via an inverter 58, a main portion of the power of the engine 8 is mechanically transmitted to the transmitting member 18 while a portion of the power of the engine 8 is consumed for the electric generation of the first electric motor M1 and converted into electric energy, and the electric energy is supplied through the inverter 58 to the second electric motor M2 to drive the second electric motor M2 and is transmitted from the second electric motor M2 to the transmitting member 18. The equipments related to the electric energy from the generation to the consumption by the second electric motor M2 make up an electric path from the conversion of a portion of the power of the engine 8 into electric energy to the conversion of the electric energy into mechanical energy.

The hybrid control means 104 controls the first electric motor rotation speed $N_{M1}$ and/or the second electric motor rotation speed $N_{M2}$ with the electric CVT function of the differential portion 11 such that the engine rotation speed $N_E$ is maintained substantially constant or rotationally controlled at an arbitrary rotation speed regardless of whether a vehicle is stopped or traveling. In other words, the hybrid control means 104 can rotationally control the first electric motor rotation speed $N_{M1}$ and/or the second electric motor rotation speed $N_{M2}$ at arbitrary rotational speed while maintaining or controlling the engine rotation speed $N_E$ substantially constant or at an arbitrary rotation speed.

For example, as can be seen from the collinear diagram of FIG. 3, if the engine rotation speed $N_E$ is raised while a vehicle is traveling, the hybrid control means 104 raises the first electric motor rotation speed $N_{M1}$ while maintaining the second electric motor rotation speed $N_{M2}$ restricted by the vehicle speed V (the drive wheels 38) substantially constant. If the engine rotation speed $N_E$ is maintained substantially constant during a shift of the automatic shifting portion 20, the hybrid control means 104 changes the first electric motor rotation speed $N_{M1}$ in the direction opposite to the change in the second electric motor rotation speed $N_{M2}$ associated with the shift of the automatic shifting portion 20 while maintaining the engine rotation speed $N_E$ substantially constant.

The hybrid control means 104 functionally includes an engine output control means that outputs commands separately or in combination to the engine output control device 43 to control opening/closing of the electronic throttle valve 96 with the throttle actuator 97 for throttle control, to control a fuel injection amount and an injection timing of the fuel injection device 98 for the fuel injection control, and to control the timing of the ignition by the ignition device 99 such as an igniter for the ignition timing control so as to execute the output control of the engine 8 to generate necessary engine output.

For example, the hybrid control means 104 drives the throttle actuator 97 basically based on the accelerator opening degree Acc in accordance with a preliminarily stored relationship not depicted to provide the throttle control such that the throttle valve opening degree $\theta_{TH}$ is increased as the accelerator opening degree Aec increases. The engine output control device 43 controls the engine torque by controlling opening/closing of the electronic throttle valve 96 with the throttle actuator 97 for the throttle control, controlling the fuel injection by the fuel injection device 98 for the fuel injection control, and controlling the timing of the ignition by the ignition device 99 such as an igniter for the ignition timing control in accordance with the commands from the hybrid control means 104.

The hybrid control means 104 can achieve the motor traveling with the electric CVT function (differential action) of the differential portion 11 regardless of whether the engine 8 is stopped or in the idle state. For example, the hybrid control means 104 performs the motor traveling in a relatively lower output torque $T_{OUT}$ zone, i.e., a lower engine torque $T_E$ zone generally considered as having poor engine efficiency as compared to a higher torque zone, or in a relatively lower vehicle speed zone of the vehicle speed V, i.e., a lower load zone. During the motor traveling, the hybrid control means 104 controls the first electric motor rotation speed $N_{M1}$ at a negative rotation speed, for example, in idling, with the electric CVT function (differential action) of the differential portion 11 to maintain the engine rotation speed $N_E$ at zero or substantially zero as needed with the differential action of the differential portion 11 so as to suppress the drag of the stopped engine 8 and improve the fuel consumption.

The hybrid control means 104 can provide so-called torque assist for complementing the power of the engine 8, even in the engine traveling range, by supplying the electric energy from the first electric motor M1 and/or the electric energy from the electric storage device 60 through the electric path described above to the second electric motor M2 and by driving the second electric motor M2 to apply a torque to the drive wheels.

The hybrid control means 104 interrupts the drive current to the first electric motor M1 supplied via the inverter 58 from the electric storage device 60 to put the first electric motor M1 into the no-load state. The first electric motor M1 is allowed to freely rotate, i.e., idle in the no-load state and the differential portion 11 is put into the state unable to transmit a torque, i.e., the state equivalent to the state with the power transmission path interrupted in the differential portion 11, in which the output from the differential portion 11 is not generated. Therefore, the hybrid control means 104 can put the first electric motor M1 into the no-load state to put the differential portion 11 into the neutral state (neutral state) that electrically interrupts the power transmission path.

The hybrid control means 104 provides the regenerative control that puts the engine 8 into the non-driving state to convert kinetic energy of a vehicle transmitted from the drive wheels 38 into the electric energy with the differential portion 11 to improve the fuel consumption (reduce a fuel consumption rate) during the inertia traveling (during coasting) when the acceleration is turned off and during braking by the foot brake and, specifically, the hybrid control means 104 provides the regenerative control that rotationally drives the second electric motor M2 to operate as an electric generator by the kinetic energy of the vehicle, i.e., a reverse drive force transmitted from the drive wheels 38 toward the engine 8 to charge the electric storage device 60 via the inverter 58 with the electric energy, i.e., a current generated by the second electric motor. In other words, the hybrid control means 104 has a function as a regenerative control means that provides the regenerative control, and provides the regenerative control when an operational point of the power transmission device 10 is determined based on a state amount indicative of the vehicle state exemplarily indicated by the accelerator opening degree Ace, the vehicle speed V, the brake pedal operation amount, a charge remaining amount SOC of the electric storage device 60, the shift stage of the automatic shifting portion 20, etc., and the operational point belongs to a regenerative range empirically defined in advance where the regenerative control should be provided. In this regenerative control, the electric energy regenerated by the second electric motor M2, i.e., a regenerative amount of this regenerative control is controlled to achieve a regenerative request amount that is a needed regenerative amount determined based on a charge remaining amount SOC of the electric storage device 60 and the braking force distribution of a braking force from a hydraulic brake for acquiring a braking force corresponding to a brake pedal operation amount.

For a shift of the automatic shifting portion 20, whether the shift is executed is determined by applying a vehicle traveling state to the shift map depicted in FIG. 7 as described above, for example, and the shift is executed if the shift is determined to be executed. For example, a vehicle speed and a request drive force, a vehicle speed and a request drive power, a vehicle speed and an accelerator opening degree, or a vehicle speed and a request engine rotation speed are used for the vehicle traveling state in the shift map. With the shift determination using the shift map, a gear shifting is mainly executed for operating the engine 8 in an efficient state. For example, the shift map of FIG. 7 depicts an example of a shift map using a vehicle speed and a request drive force (request output torque) as a vehicle traveling state.

On the other hand, the differential portion 11 having the second electric motor M2 and the first electric motor M1 is connected such that the regeneration is provided via the automatic shifting portion 20 in the power transmission device 10 of this embodiment, and at least one of these electric motors provides the regenerative control in the regenerative traveling state of a vehicle. If a shift of the automatic shifting portion 20 is executed based on the shift map while the regenerative control is provided, a change is made in the operation state of the electric motor providing the regenerative control, i.e., the rotation speed and the output torque of the electric motor. It is contemplated that the change in the operation state of the electric motor deteriorates the regenerative efficiency of the electric motor and reduces the fuel economy as compared to those before the shift. Although the following embodiments will be described with an example when the second electric motor M2 provides the regenerative control, the regenerative control can be provided independently by each of the first electric motor M1 and the second electric motor M2 or can be provided by the both motors in a coordinated manner.

Figure 9:
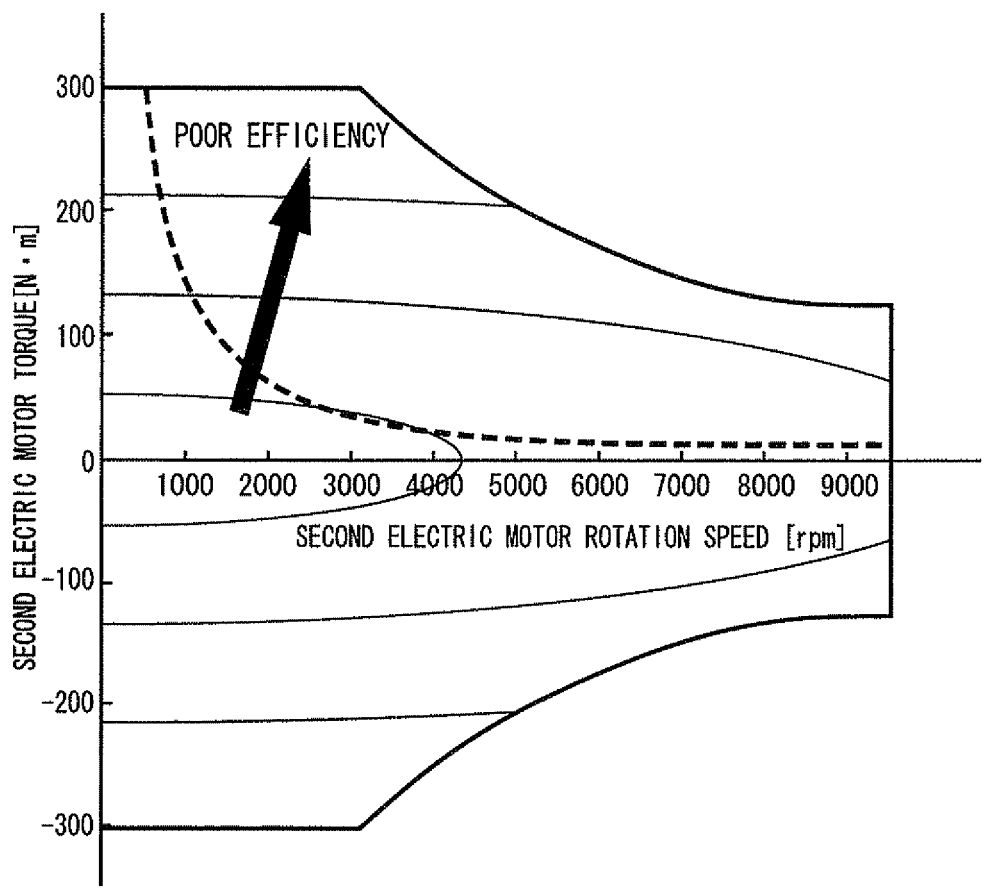
FIG. 9 is a diagram representing the efficiency of the second electric motor used under the regenerative control in the vehicle power transmission device, for the driving state represented by the rotation speed and torque.

FIG. 9 is a diagram of an example of the efficiency of the second electric motor M2 represented in a plane defined by the rotation speed $N_{M2}$ of the second electric motor M2 as the horizontal axis and the output torque $T_{M2}$ of the second electric motor M2 as the vertical axis. If the output torque $T_{M2}$ is negative, the second electric motor M2 provides the regenerative control and this corresponds to the case that a regenerative torque is generated. In FIG. 9, a plurality of solid curved lines drawn like contour lines represent efficiency level lines acquired by linking the points each indicative of the operation state having equivalent efficiency. As the operation state changes in the direction indicated by an arrow of FIG. 9, i.e., toward higher torque and higher rotation speed, the efficiency deteriorates. In FIG. 9, a broken line represents a power level line. Since the efficiency of the second electric motor M2 providing the regenerative control changes due to the rotation speed $N_{M2}$ and the torque $T_{M2}$ thereof, if a shift of the automatic shifting portion 20 is executed while the second electric motor M2 provides the regenerative control and the rotation speed and the torque $T_{M2}$ are changed in the input shaft 18 of the automatic shifting portion 20, i.e., the second electric motor M2, the efficiency of the second electric motor M2 changes.

Therefore, if a vehicle is in the regenerative traveling state, a regenerative-period shift determining means 110 determines whether a shift of the automatic shifting portion 20 is executed, instead of the shifting control means 102. Specifically, the regenerative-period shift determining means 110 compares a travelling loss in the power transmission device 10 at the current gear ratio with a travelling loss in the power transmission device 10 at the gear ratio after a shift and determines that the shift of the automatic shifting portion 20 is executed if the travelling loss in the power transmission device 10 at the gear ratio after the shift is smaller than the travelling loss in the power transmission device 10 at the current gear ratio. In response to the determination of execution of the shift by the regenerative-period shift determining means 110, the shifting control means 102 specifies an oil pressure etc., for executing the shift to the hydraulic control circuit 42. The regenerative-period shift determining means 110 functionally includes a loss comparing means 114 to compare a traveling loss in the power transmission device 10 at the current gear ratio and a traveling loss in the power transmission device 10 at the gear ratio after the shift calculated by a loss calculating means 118 described later.

The loss calculating means 118 calculates a traveling loss in the power transmission device 10 at the current gear ratio of the automatic shifting portion 20 and a traveling loss in the power transmission device 10 at the gear ratio after a shift when a vehicle is in the regenerative traveling state. In this embodiment, a traveling loss in the power transmission device 10 is specifically calculated as a sum of a traveling loss in the automatic shifting portion 20 and a traveling loss in the second electric motor M2 that provides the regenerative control, for example.

The loss calculating means 118 functionally includes an electric motor loss calculating means 120, an inverter loss calculating means 122, and an automatic shifting portion loss calculating means 124. The electric motor loss calculating means 120 calculates a loss in the second electric motor M2 that provides the regenerative control, and the inverter loss calculating means 122 calculates a loss in the inverter 58 that drives the second electric motor M2 and the first electric motor M1. The traveling loss in the second electric motor M2 providing the regenerative control is calculated as a sum of a loss in the second electric motor M2 that provides the regenerative control calculated by the electric motor loss calculating means 120 and a loss in the inverter 58 calculated by the inverter loss calculating means 122. The automatic shifting portion loss calculating means 124 calculates a traveling loss in the automatic shifting portion 20.

Specifically, the electric motor loss calculating means 120 calculates a loss in the second electric motor M2 providing the regenerative control by applying values of parameters such as a temperature $T_{M2}$ of the second electric motor M2 providing the regenerative control detected by an electric motor temperature sensor 82, a rotation speed $N_{M2}$ of the second electric motor M2, and an input torque to the second electric motor M2 to a predetermined relationship stored in advance. The predetermined relationship is, for example, a map or a relational expression as depicted in FIG. 9 that correlates values of parameters such as the temperature $T_{M2}$ of the second electric motor M2 providing the regenerative control, the rotation speed $N_{M2}$ of the second electric motor M2, and the input torque to the second electric motor M2 with a loss in the second electric motor M2 providing the regenerative control, is acquired for each of the first electric motor M1 and the second electric motor M2 from experiments and simulations in advance, and is stored in advance in a storage means such as a memory not depicted. The rotation speed $N_{M2}$ of the second electric motor M2 can be calculated from, for example, a vehicle speed V and a gear ratio of the automatic shifting portion 20 and, therefore, the loss may be calculated based on the vehicle speed V and the gear ratio of the automatic shifting portion 20 instead of the rotation speed $N_{M2}$ of the second electric motor M2. The vehicle speed V is calculated from, for example, the rotation speed $N_{out}$ of the output shaft 24 detected by an output shaft rotation speed sensor 86 in consideration of the reduction ratio of the final reduction device 36 and the diameter of the drive wheels 38 and the like.

The inverter loss calculating means 122 calculates a loss in the inverter 58 by applying values of parameters such as a temperature of the inverter 58 detected by a temperature sensor not depicted and an output (such as electric current, voltage, and electric power) of the inverter 58 to a predetermined relationship. The predetermined relationship correlates values of parameters such as the temperature and the output of the inverter 58 with a loss in the inverter 58, is acquired from experiments and simulations in advance, and is stored in advance in a storage means such as a memory not depicted.

The automatic shifting portion loss calculating means 124 calculates a traveling loss in the automatic shifting portion 20 by applying values of parameters such as an oil temperature $T_{OIL}$ of the operating oil of the automatic shifting portion 20 detected by an oil temperature sensor 84, a vehicle speed v, an input torque to the automatic shifting portion 20, and a property of the operating oil of the automatic shifting portion 20 to a predetermined relationship stored in advance. The predetermined relationship correlates values of parameters such as the oil temperature $T_{OIL}$ of the operating oil of the automatic shifting portion 20, the vehicle speed V, the input torque to the automatic shifting portion 20, and the property of the operating oil of the automatic shifting portion 20 with a traveling loss in the automatic shifting portion 20, is acquired from experiments and simulations in advance, and is stored in advance in a storage means such as a memory not depicted. The property of the operating oil is, for example, viscosity based on material, degraded state, etc., of the operating oil and is acquired by preliminarily entering information about the operating oil used.

Figure 10:
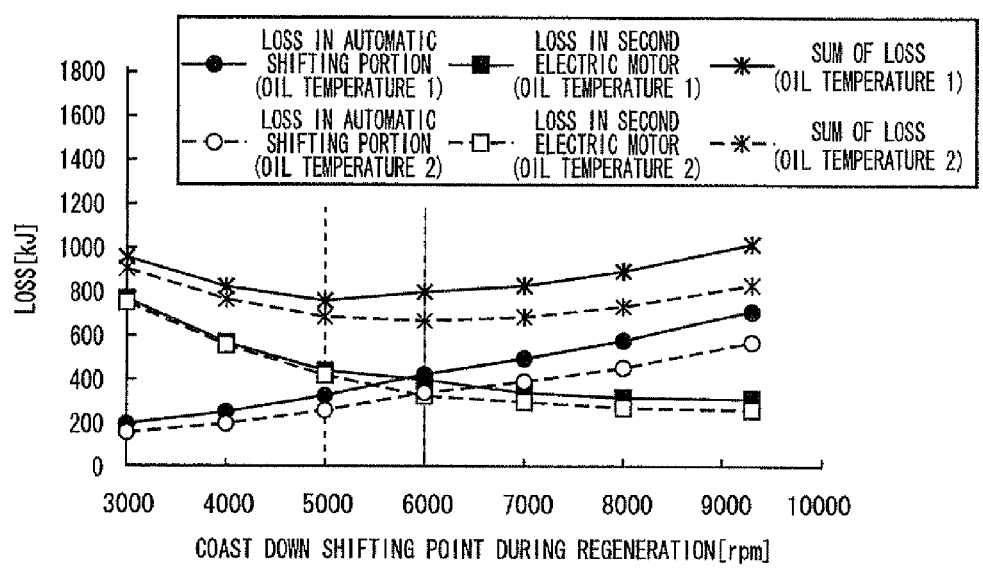
FIG. 10 is a diagram representing the losses of the vehicle power transmission device, and the automatic shifting portion and the second electric motor constituting the vehicle power transmission device in each of shifting points at which the shifting action is operated.

FIG. 10 is a diagram of respective relationships between a value of the input shaft rotation speed $N_{18}$ (=the second electric motor rotation speed $N_{M2}$) of the automatic shifting portion 20 when the automatic shifting portion 20 executes a shift from the fourth speed stage to the third speed stage, for example, and the traveling losses in the automatic shifting portion 20, the second electric motor M2, and the power transmission device 10 after the shift. FIG. 10 depicts the relationships in the case of two different temperatures, i.e., a temperature 1 and a temperature 2 for each of the operating oil temperature $T_{OIL}$ of the automatic shifting portion 20 and the temperature $T_{M2}$ of the second electric motor M2.

In FIG. 10, a plot indicated by a circle represents a traveling loss in the automatic shifting portion 20 calculated by the automatic shifting portion loss calculating means 124, for example. A plot indicated by a square represents a traveling loss in the second electric motor M2 calculated by the electric motor loss calculating means 120 and the inverter loss calculating means 122, for example. A plot indicated by an asterisk represents a traveling loss in the power transmission device 10 acquired in this embodiment as a sum of a traveling loss in the automatic shifting portion 20 and a traveling loss in the second electric motor M2 providing the regenerative control. A solid line represents the case of the oil temperature 1 of the operating oil temperature $T_{OIL}$ of the automatic shifting portion 20 and the temperature $T_{M2}$ of the second electric motor M2, and a broken line represents the case of the oil temperature 2, which is a temperature higher than the oil temperature 1.

Focusing attention on the case of the oil temperature 1, i.e., the relationships represented by solid lines in FIG. 10, the traveling loss in the automatic shifting portion 20 becomes larger when the input shaft rotation speed $N_{18}$ is higher, and the traveling loss in the second electric motor M2 providing the regenerative control becomes smaller as the rotation speed N increases. In FIG. 10, the traveling loss in the power transmission device 10 is minimal in the vicinity of 5000 rpm.

The case of the oil temperature 2 higher than the oil temperature 1, i.e., the case of broken lines of FIG. 10 has the same tendency. However, since the higher temperature leads to a change in the viscosity of the operating oil of the automatic shifting portion 20 or a change in the efficiency of the second electric motor M2 providing the regenerative control, the relationship between the input shaft rotation speed $N_{18}$ and the efficiency of the power transmission device 10 is different from that of the oil temperature 1. For example, the minimum of the loss of the power transmission device 10 at the oil temperature 2 appears in the vicinity of 6000 rpm of the input shaft rotation speed $N_{18}$. As described above, the calculation of loss by the loss calculating means 118 is performed in accordance with the operating oil temperature $T_{OIL}$ of the automatic shifting portion 20 and the temperature $T_{M2}$ of the second electric motor M2.

The loss calculating means 118 calculates a traveling loss in the power transmission device 10 in the case of maintaining the current gear ratio of the automatic shifting portion 20 and a traveling loss in the power transmission device 10 in the case of the gear ratio of the automatic shifting portion 20 after a shift if the shift is executed, as described above. The loss comparing means 114 of the regenerative-period shift determining means 110 compares the both calculated traveling losses and determines that the shift of the automatic shifting portion 20 is executed if the travelling loss in the power transmission device 10 at the gear ratio after the shift is smaller than the travelling loss in the power transmission device 10 at the current gear ratio.

Figure 11:
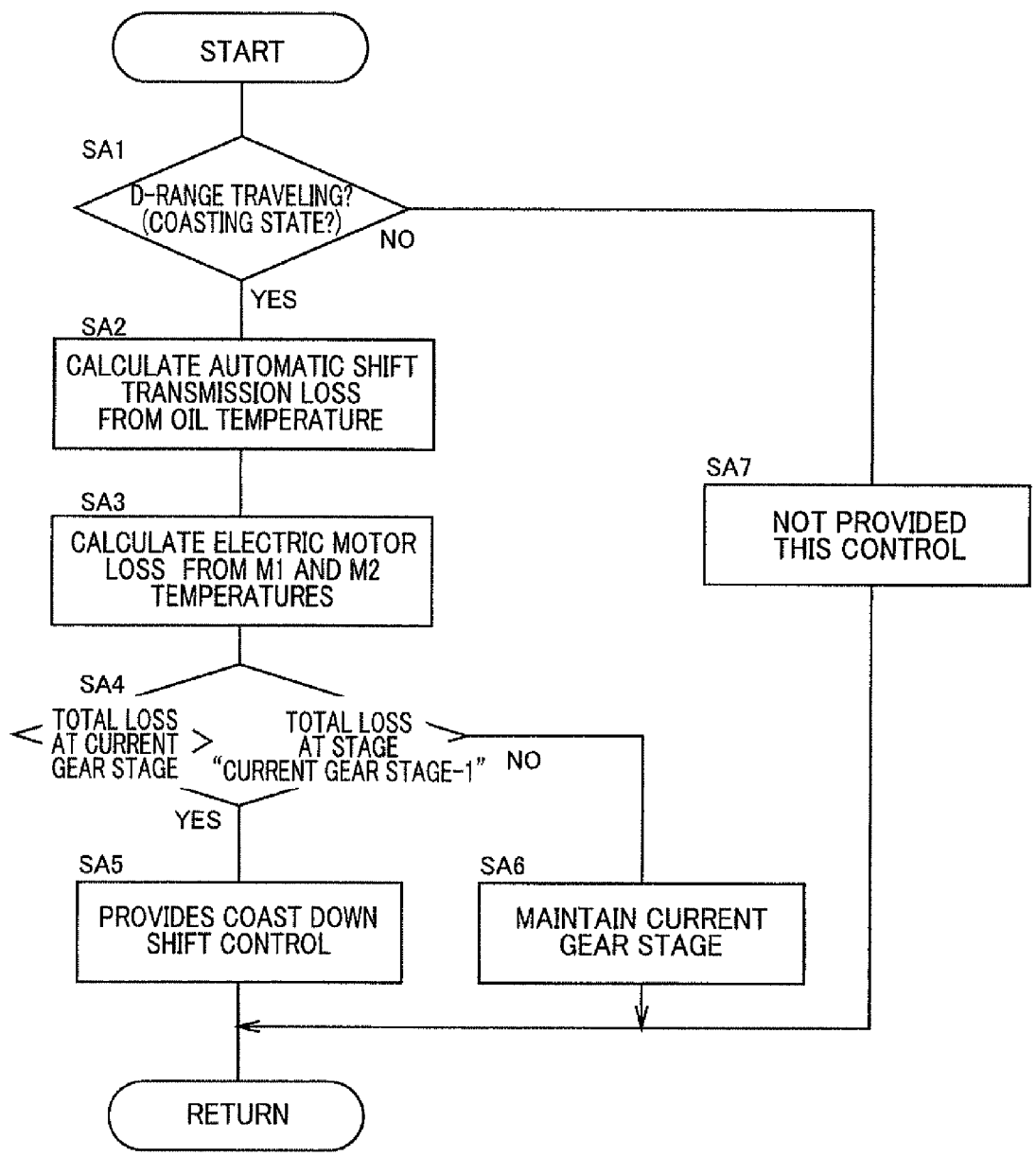
FIG. 11 is a flowchart for explaining an example of the control operation of the electronic control device of FIG. 4, the control operation of the determination of shift during the regenerative traveling of the vehicle.

FIG. 11 is a flowchart for explaining an example of the control operation of the electronic control device 100 in this embodiment, i.e., the control operation related to the determination of shift of the automatic shifting portion 20 during the regenerative traveling of a vehicle.

At SA1, a determination is made on a traveling state of a vehicle. Specifically, for example, it is determined whether the shift position $P_{SH}$ is the "D" position, i.e., whether a plurality of shift stages of the automatic shifting portion 20 can be used for traveling. It is also determined whether the vehicle is in the coasting state with an electric motor providing the regenerative control. If a plurality of shift stages of the automatic shifting portion 20 can be used for traveling and an electric motor provides the regenerative control in the traveling state, the determination at this step is affirmative and SA2 is executed. If a plurality of shift stages of the automatic shifting portion 20 cannot be used for traveling or if the electric motor does not provide the regenerative control in the traveling state, the determination at this step is negative and SA7 is executed.

At SA2 corresponding to the automatic shifting portion loss calculating means 124 of the loss calculating means 118 etc., a value of traveling loss in the automatic shifting portion 20 is calculated for each of the cases of traveling at the current gear ratio of the automatic shifting portion 20 and of traveling at the gear ratio after the shift if the shift of the automatic shifting portion 20 is executed. The calculation of traveling loss in the automatic shifting portion 20 at this step is performed based on the oil temperature $T_{OIL}$ of the operating oil in the automatic shifting portion 20 detected by the oil temperature sensor 84 etc.

At SA3 corresponding to the electric motor loss calculating means 120 and the inverter loss calculating means 122 of the loss calculating means 118 and the like, a value of traveling loss in the second electric motor M2, i.e., the electric motor providing the regenerative control is calculated for each of the cases of traveling at the current gear ratio of the automatic shifting portion 20 and of traveling at the gear ratio after the shift if the shift of the automatic shifting portion 20 is executed. The traveling loss in the second electric motor M2 is calculated so as to include a loss in the inverter 58 involved in the drive of the second electric motor M2. The calculation of traveling loss in the second electric motor M2 at this step is performed based on the temperature $T_{M2}$ of the second electric motor M2 detected by the temperature sensor 82 etc.

At SA4 corresponding to the loss comparing means 114 of the regenerative-period shift determining means 110 and the like, a traveling loss in the power transmission device 10 is calculated and compared for each of the cases of traveling at the current gear ratio of the automatic shifting portion 20 and of traveling at the gear ratio after the shift if the shift of the automatic shifting portion 20 is executed, based on the traveling loss in the automatic shifting portion 20 and the traveling loss in the second electric motor M2 providing the regenerative control calculated at SA2 and SA3, respectively. The traveling loss in the power transmission device 10 is calculated as a sum of the traveling loss in the automatic shifting portion 20 and the traveling loss in the second electric motor M2 providing the regenerative control, for example. As a result of comparison, if the travelling loss in the power transmission device 10 in the case of traveling at the current gear ratio of the automatic shifting portion 20 is greater than the travelling loss in the power transmission device 10 in the case of traveling at the gear ratio after the shift if the shift of the automatic shifting portion 20 is executed, the determination at this step is affirmative and SA5 is executed. In contrast, if the travelling loss in the power transmission device 10 in the case of traveling at the current gear ratio of the automatic shifting portion 20 is equal to or smaller than the travelling loss in the power transmission device 10 in the case of traveling at the gear ratio after the shift if the shift of the automatic shifting portion 20 is executed, the determination at this step is negative and SA6 is executed.

At SA5 executed if the determination at SA4 is affirmative, the shift of the automatic shifting portion 20 is determined and the hydraulic control circuit 42 is controlled to supply an oil pressure to the friction engagement devices to be engaged for establishing the shift stage after the shift and to supply no oil pressure to the friction engagement devices to be released.

At SA6 executed if the determination at SA5 is negative, the shift of the automatic shifting portion 20 is not determined and the shift stage used for the past traveling is maintained.

At SA7 executed if the determination at SA1 is negative, the control in this embodiment, i.e., the shift control of the automatic shifting portion 20 during the regenerative traveling of a vehicle is not provided, and another control is provided or the flowchart is terminated.

According to the embodiment, in the control device 100 for the power transmission device 10 comprising the automatic shifting portion 20 and the differential portion 11 including the second electric motor that provides regeneration via the automatic shifting portion 20, since a downshift of the automatic shifting portion 20 is executed if a traveling loss in the power transmission device 10 after a shift is smaller than a traveling loss in the power transmission device 10 at the current gear ratio during the regenerative traveling, the deterioration in traveling loss due to a shift is reduced in the power transmission device 10 and the fuel economy is improved.

According to the embodiment, since a traveling loss in the power transmission device 10 includes a loss in the automatic shifting portion 20 and the loss in the automatic shifting portion 20 is calculated based on the operating oil temperature $T_{OIL}$ of the automatic shifting portion 20, the loss in the automatic shifting portion 20 changed based on the oil temperature $T_{OIL}$ of the operating oil can accurately be calculated.

According to the embodiment, since a traveling loss in the power transmission device 10 includes a loss in the second electric motor M2 providing the regenerative control and the loss in the second electric motor M2 is calculated based on the temperature $T_{M2}$ of the electric motor, the loss in the second electric motor M2 changed based on the temperature $T_{M2}$ can accurately be calculated.

According to the embodiment, the power transmission device 10 includes the differential portion 11 disposed on the power transmission path from the engine 8 to the drive wheels 38 and the differential portion 11 is characterized by including the differential mechanism 16, the first electric motor M1 coupled in a power transmittable manner to the second rotating element RE2 among the rotating elements of the differential mechanism 16, and the second electric motor M2 coupled in a power transmittable manner to the third rotating element RE3. This enables the regenerative control to be provided during deceleration of a vehicle by both or one of the first electric motor M1 and the second electric motor M2 coupled in a power transmittable manner to the rotating elements RE2 and RE3, respectively, of the differential portion 11.

According to the embodiment, since the differential mechanism 16 includes the first rotating element RE1 coupled to the engine 8, the second rotating element RE2 coupled to the first electric motor M1, and the third rotating element RE3 coupled to the transmitting member 18 that transmits the output of the differential mechanism 16 to the automatic shifting portion 20 and the second electric motor M2 is coupled to the third rotating element RE3, the regenerative output can be generated by both or one of the first electric motor M1 and the second electric motor M2 coupled via the differential mechanism 16. By controlling the operation states of the first electric motor M1 and the second electric motor M2, the differential state of the differential mechanism 16 can he changed and the differential mechanism can be operated as a stepless transmission capable of continuously varying the gear ratio.

According to the embodiment, the automatic shifting portion 20 is a mechanical stepped transmission capable of varying the gear ratio in a stepped manner and, therefore, when an amount of change is increased in the gear ratio of the automatic shifting portion 20, an increase in size of the automatic shifting portion 20 can be suppressed.

According to the embodiment, since a loss in the first electric motor M1 or the second electric motor M2 includes a loss in the inverter 58 related to the drive of the first electric motor M1 or the second electric motor M2, the loss in the inverter 58 is taken into consideration when the traveling loss in the power transmission device 10 is calculated, and the traveling loss in the power transmission device 10 is accurately calculated and the comparison thereof can accurately be made.

Another embodiment of the present invention will then be described. In the following description, the portions common to the embodiments are denoted by the same reference numerals and will not be described.

Second Embodiment

In this embodiment, the regenerative-period shift determining means 110 functionally includes a vehicle state determining means 112. The vehicle state determining means 112 makes a determination on a shift of the automatic shifting portion 20 by applying a vehicle state, for example, a vehicle speed v and an output power or an output torque of the second electric motor M2 providing the regenerative control, to a regenerative traveling shift map stored in advance in a shift map storage means 116 described later.

The shift map storage means 116 preliminarily stores the regenerative traveling shift map, i.e., a relationship for determined whether a downshift of the automatic shifting portion 20 is executed when a vehicle travels in a regenerative manner. This relationship uses, for example, the vehicle speed v and the output power of the second electric motor M2 providing the regenerative control, or the vehicle speed v and the output torque of the second electric motor M2 providing the regenerative control, as variables.

If a downshift of the automatic shifting portion 20 is executed during the regenerative traveling of a vehicle, a torque is reduced and a rotation speed is increased in the input shaft of the automatic shifting portion 20, i.e., the transmitting member 18 to which the second electric motor M2 is coupled. If the characteristics of the second electric motor M2 providing the regenerative control are represented, for example, as in FIG. 9, when the operation state of the second electric motor M2 is changed toward a lower torque and a higher rotation speed, the efficiency of the second electric motor M2 is improved. However, in the case of the characteristics of the second electric motor M2 represented in the example of FIG. 9, when a level of torque, i.e., an absolute value of torque falls below a predetermined torque, a range of improvement in the efficiency improved due to the change in the operation state is narrowed even if the operation state is changed so as to achieve a lower torque and a higher rotation speed. On the other hand, as depicted in FIG. 10, if a shift of the automatic shifting portion 20 is executed at a higher rotation speed, the efficiency of the automatic shifting portion 20 is increased due to increase in rotations of the rotating elements. Therefore, the efficiency of the automatic shifting portion 20 is deteriorated to the extent that the improvement in the efficiency of the second electric motor M2 is canceled and, as a result, the fuel economy may be reduced.

Therefore, in this embodiment, the vehicle speed v and the power or torque of the second electric motor M2 are defined as variables in the regenerative traveling shift map stored in the shift map storage means 116 for determining the shift stage used in the automatic shifting portion 20. If the vehicle travels in a regenerative manner, the vehicle state determining means 112 of the regenerative-period shift determining means 110 determines whether a shift of the automatic shifting portion 20 is executed, in accordance with the vehicle state including the vehicle speed v and the power or torque of the second electric motor M2, and the regenerative traveling shift map.

Figure 12:
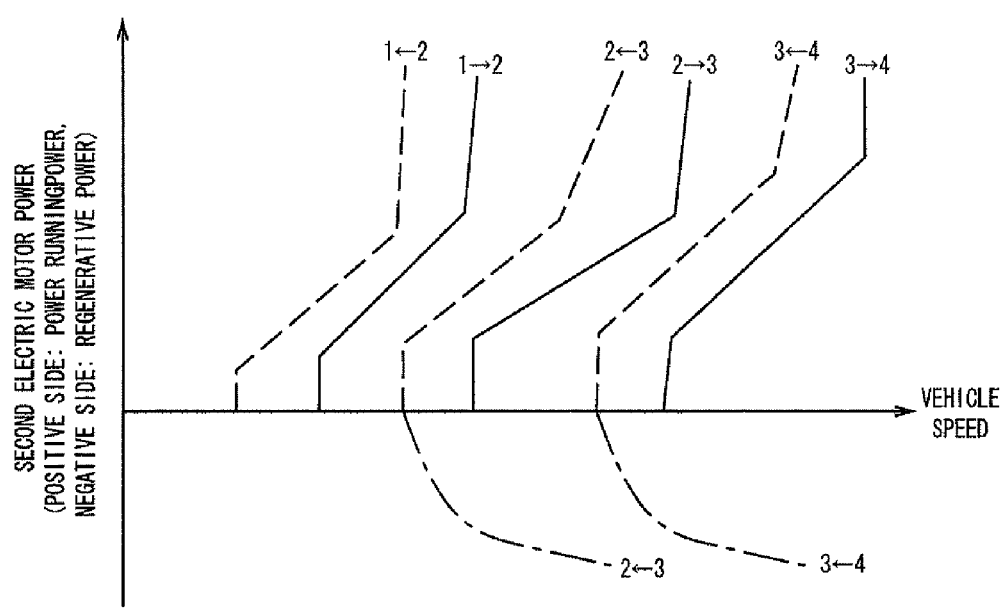
FIG. 12 is a diagram for explaining an example of the regenerative traveling shift map stored in the shift map storage means of FIG. 6.

FIG. 12 is a diagram of an example of the regenerative traveling shift map using the vehicle speed v and the output power of the second electric motor M2 as variables. In FIG. 12, the output power being positive means that the second electric motor M2 is in the power running state and the output power being negative means that the second electric motor M2 is in the regenerative state. Therefore, a range of the negative output power in the shift map of FIG. 12 corresponds to the regenerative traveling shift map. Although a range of the positive output power is also defined in the shift map depicted in FIG. 12, it is only necessary to define at least the range of the negative output power, i.e., the case that the second electric motor M2 providing the regenerative control is in the regenerative control state. Alternatively, the range of the positive output power may be used as a shift map for the shift determination by the shifting control means 102.

The regenerative traveling shift map of FIG. 12 is defined such that the loss in the power transmission device 10 is not deteriorated by the shift of the automatic shifting portion 20. In other words, a shifting line indicative of a downshift in the regenerative traveling shift map of FIG. 12 corresponds to a boundary between a range representative of the traveling state while the loss in the power transmission device 10 in the case of executing the shift of the automatic shifting portion 20 is smaller than the loss in the case of not executing the shift and a range representative of the traveling state while the loss in the power transmission device 10 in the case of executing the shift of the automatic shifting portion 20 is greater than the loss in the case of not executing the shift. A shifting line indicative of a downshift in the regenerative traveling shift map is a series of shifting points indicative of a vehicle state when a downshift of the automatic shifting portion 20 is executed. The regenerative traveling shift map as depicted in FIG. 12 is acquired in advance empirically or from simulations etc.

As depicted in FIG. 10, the efficiencies of the second electric motor M2 providing the regenerative control and the automatic shifting portion 20 vary depending on the temperature of the second electric motor M2 and the temperature of the operating oil of the automatic shifting portion 20 (hereinafter, simply the temperature), respectively. Therefore, the shift map storage means 116 may store the regenerative traveling shift map in advance for each of a plurality of different temperatures. A regenerative traveling shift map is selected that corresponds to the temperature $T_{M2}$ of the second electric motor M2 providing the regenerative control detected by the electric motor temperature sensor 82 or the oil temperature $T_{OIL}$ of the operating oil of the automatic shifting portion 20 detected by the oil temperature sensor 84, and the vehicle state determining means 112 determines the shift of the automatic shifting portion 20 based on the selected regenerative traveling shift map.

Figure 13:
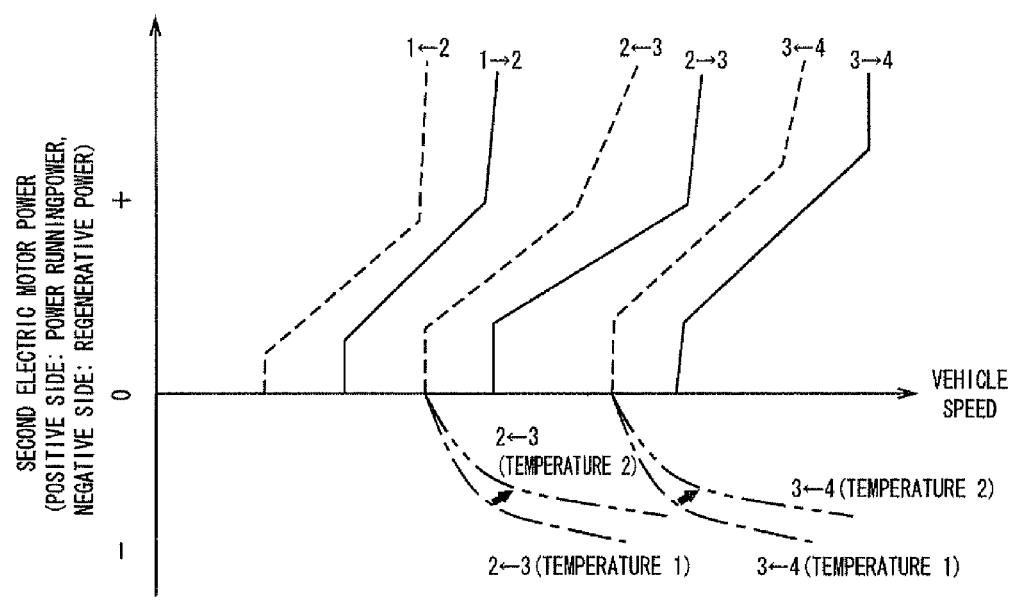
FIG. 13 is a diagram for explaining an example of the regenerative traveling shift map stored according to the operating oil temperature of the automatic shifting portion and the temperature of the second electric motor for the regenerative control, corresponding to FIG. 12.

FIG. 13 is a diagram for explaining an example of the regenerative traveling shift map for a plurality of different temperatures. In FIG. 13, a regenerative traveling map represented by a one-dot chain line indicates a relationship for determining a shift of the automatic shifting portion 20 during the regenerative traveling of the vehicle at a temperature 1 that is a predetermined temperature, and a regenerative traveling map represented by a two-dot chain line is an example of a regenerative traveling map at a temperature 2 that is a temperature higher than the predetermined temperature. In FIG. 13, the shift of the automatic shifting portion 20 is assumed to be executed in a vehicle state associated with a lower degree of the power of the second electric motor M2 providing the regenerative control if the vehicle speed is the same in the case of the temperature 2 as compared to the case of the temperature 1.

Figure 14:
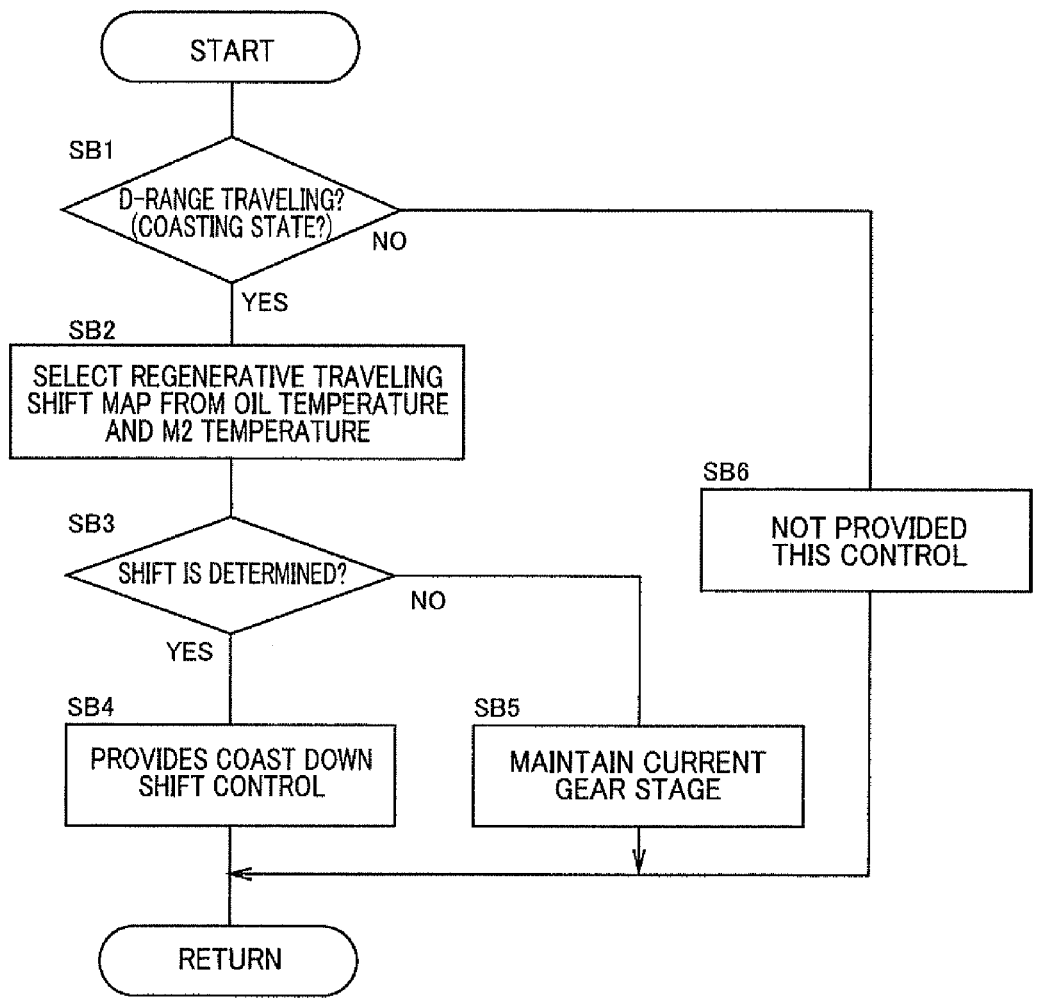
FIG. 14 is a flowchart for explaining another example of the control operation of the electronic control device of FIG. 4, the control operation of the determination of shift during the regenerative traveling of the vehicle.

FIG. 14 is a flowchart for explaining an example of the control operation of the electronic control device 100 in this embodiment, i.e., the control operation related to the determination of shift of the automatic shifting portion 20 during the regenerative traveling of the vehicle, corresponding to FIG. 11 of the embodiment described above.

At SB1, a determination is made on a traveling state of a vehicle as is the case with SA1 of FIG. 11. Specifically, for example, it is determined whether the shift position $P_{SH}$ is the "D" position, i.e., whether a plurality of shift stages of the automatic shifting portion 20 can be used for traveling. It is also determined whether the vehicle is in the coasting state with an electric motor providing the regenerative control. If a plurality of shift stages of the automatic shifting portion 20 can be used for traveling and an electric motor provides the regenerative control in the traveling state, the determination at this step is affirmative and SB2 is executed. If a plurality of shift stages of the automatic shifting portion 20 cannot be used for traveling or if the electric motor does not provide the regenerative control in the traveling state, the determination at this step is negative and SB6 is executed.

At SB2, a suitable regenerative traveling shift map is selected from a plurality of regenerative traveling shift maps stored in the shift map storage means 116 based on both or one of the second electric motor temperature $T_{M2}$ providing the regenerative control detected by the second electric motor M2 temperature sensor 82 and the oil temperature $T_{OIL}$ of the operating oil of the automatic shifting portion 20 detected by the oil temperature sensor 84.

At SB3 corresponding to the vehicle state determining means 112 of the regenerative-period shift determining means 110 etc., it is determined whether a shift of the automatic shifting portion 20 is executed, based on the regenerative traveling shift map selected at SB2. Specifically, for example, the shift stage to be used in the automatic shifting portion 20 is determined based on where the vehicle state defined by the current vehicle speed and the power of the second electric motor M2 providing the regenerative control is located on the regenerative traveling shift map selected at SB2. If the shift stage to be used and the current shift stage are different, the shift to the shift stage to be used is determined and the determination of this step is affirmed to execute SB4. If the shift stage to be used and the current shift stage are the same, the shift is not determined and the determination of this step is denied to execute SB5.

At SB4 executed if the determination at SB3 is affirmative, the shift of the automatic shifting portion 20 is determined and the hydraulic control circuit 42 is controlled to supply an oil pressure to the friction engagement devices to be engaged for establishing the shift stage after the shift and to supply no oil pressure to the friction engagement devices to be released.

At SB5 executed if the determination at SB3 is negative, the shift of the automatic shifting portion 20 is not determined and the shift stage used for the past traveling is maintained.

At SB6 executed if the determination at SB1 is negative, the control in this embodiment, i.e., the shift control of the automatic shifting portion 20 during the regenerative traveling of a vehicle is not provided, and another control is provided or the flowchart is terminated.

According to the embodiment, since the shift map storage means 116 stores a regenerative traveling shift map set in accordance with the vehicle speed v and the power of the second electric motor M2 providing the regenerative control for executing a shift of the automatic shifting portion 20 during the regenerative traveling and the vehicle state determining means 112 of the regenerative-period shift determining means 110 executes the shift based on the regenerative traveling shift map stored in the shift map storage means 116 during the regenerative traveling, the shift of the automatic shifting portion 20 during the regenerative traveling is executed based on the regenerative traveling shift map set in accordance with the vehicle speed v and the power of the second electric motor M2 providing the regenerative control; therefore, a determination can be made on the case that a traveling loss in the power transmission device 10 after the shift is smaller than a traveling loss in the power transmission device 10 at the current gear ratio based on the regenerative traveling shift map; a downshift of the automatic shifting portion 20 is executed based on the determination; and, as a result, this reduces the deterioration in traveling loss due to a shift in the power transmission device 10, improves the fuel economy, and reduces an amount of calculation for determining the shift.

According to the embodiment, since the shift map storage means 116 stores a regenerative traveling shift map set in accordance with the vehicle speed v and the torque of the second electric motor M2 providing the regenerative control for executing a shift of the automatic shifting portion 20 during the regenerative traveling and the vehicle state determining means 112 of the regenerative-period shift determining means 110 executes the shift based on the regenerative traveling shift map stored in the shift map storage means 116 during the regenerative traveling, the shift of the automatic shifting portion 20 during the regenerative traveling is executed based on the regenerative traveling shift map set in accordance with the vehicle speed v and the torque of the second electric motor M2 providing the regenerative control; therefore, a determination can be made on the case that a traveling loss in the power transmission device 10 after the shift is smaller than a traveling loss in the power transmission device 10 at the current gear ratio based on the regenerative traveling shift map; a downshift of the automatic shifting portion 20 is executed based on the determination; and, as a result, this reduces the deterioration in traveling loss due to a shift in the power transmission device 10, improves the fuel economy, and reduces an amount of calculation for determining the shift.

According to the embodiment, the regenerative traveling shift map stored in the shift map storage means 116 corresponds to the operating oil temperature $T_{OIL}$ of the automatic shifting portion 20. Therefore, since a shifting point for executing a downshift of the automatic shifting portion 20 is set in advance depending on the operating oil temperature $T_{OIL}$ of the automatic shifting portion 20 such that the downshift of the automatic shifting portion 20 is executed if a traveling loss in the power transmission device 10 after the shift is smaller than a traveling loss in the power transmission device 10 at the current gear ratio, the downshift of the automatic shifting portion 20 is executed if a traveling loss in the power transmission device 10 after the shift is smaller than a traveling loss in the power transmission device 10 at the current gear ratio based on the shifting point set in advance depending on the operating oil temperature $T_{OIL}$, and this reduces the deterioration in traveling loss due to a shift in the power transmission device 10, improves the fuel economy, and reduces an amount of calculation for determining the shift.

According to the embodiment, the regenerative traveling shift map stored in the shift map storage means 116 corresponds to the temperature $T_{M2}$ of the second electric motor M2 providing the regenerative control. Therefore, since a shifting point for executing a downshift of the automatic shifting portion 20 is set in advance depending on the temperature $T_{M2}$ of the second electric motor M2 providing the regenerative control such that the downshift of the automatic shifting portion 20 is executed if a traveling loss in the power transmission device 10 after the shift is smaller than a traveling loss in the power transmission device 10 at the current gear ratio, the downshift of the automatic shifting portion 20 is executed if a traveling loss in the power transmission device 10 after the shift is smaller than a traveling loss in the power transmission device 10 at the current gear ratio based on the shifting point set in advance depending on the temperature $T_{M2}$ of the second electric motor M2 providing the regenerative control, and this reduces the deterioration in traveling loss due to a shift in the power transmission device 10, improves the fuel economy, and reduces an amount of calculation for determining the shift.

According to the embodiment, since the shift map storage means 116 stores a regenerative traveling shift map set in accordance with the vehicle speed v and the power of the second electric motor M2 for executing a shift of the automatic shifting portion 20 during the regenerative traveling and the vehicle state determining means 112 of the regenerative-period shift determining means 110 executes the shift based on the regenerative traveling shift map stored in the shift map storage means 116 during the regenerative traveling, the first electric motor M1 and the second electric motor M2 provides the regenerative output in a coordinated manner; therefore, the regenerative power from the second electric motor M2 is reduced; and even if an amount of reduction is small in the loss in the differential portion 11 including both the loss in the first electric motor M1 and the loss in the second electric motor M2 at the time of downshift, the shift of the automatic shifting portion 20 can be executed.

According to the embodiment, since the shift map storage means 116 stores a regenerative traveling shift map set in accordance with the vehicle speed v and the torque of the second electric motor M2 for executing a shift of the automatic shifting portion 20 during the regenerative traveling and the vehicle state determining means 112 of the regenerative-period shift determining means 110 executes the shift based on the regenerative traveling shift map stored in the shift map storage means 116 during the regenerative traveling, the first electric motor M1 and the second electric motor M2 provide the regenerative output in a coordinated manner; therefore, the regenerative torque from the second electric motor M2 is reduced; and even if an amount of reduction is small in the loss in the differential portion 11 including both the loss in the first electric motor M1 and the loss in the second electric motor M2 at the time of downshift, the shift of the automatic shifting portion 20 can be executed.

Although the embodiments of the present invention have been described in detail with reference to the drawings, the present invention is applicable in other forms.

For example, although the automatic shifting portion 20 of the embodiments is a transmission having four forward speeds and one backward speed, the shift stages and the coupling relationship of the transmission are not particularly limited. For example, the present invention is applicable to any transmissions having a shift ratio variable step-by-step and having a different traveling loss for each shift ratio.

Although the power distribution mechanism 16 of the embodiments has the first carrier CA1 coupled to the engine 8, the first sun gear S1 coupled to the first electric motor M1, and the first ring gear R1 coupled to the transmitting member 18, these coupling relationships are not limited thereto and the engine 8, the first electric motor M1, and the transmitting member 18 may be coupled to any of the three rotating elements CA1, S1, and R1 of the first planetary gear device 24.

Although the first electric motor M1 and the second electric motor M2 are concentrically disposed on the input shaft 14 in the embodiments with the first electric motor M1 coupled to the first sun gear S1 and the second electric motor M2 coupled to the transmitting member 18, the electric motors may not necessarily be disposed in this way and, for example, the first electric motor M1 may be coupled to the first sun gear S1 and the second electric motor M2 may be coupled to the transmitting member 18 operatively via a gear, a belt, a reduction device, etc.

Although the engine 8 is directly coupled to the input shaft 14 in the embodiments, the engine 8 may be coupled operatively via a gear or a belt, for example, and may not be disposed on the common shaft center.

In the embodiments, the hydraulic friction engagement devices such as the first clutch C1 and the second clutch C2 may be made up of magnetic, electromagnetic, and mechanical engagement devices such as powder (magnetic particle) clutches, electromagnetic clutches, and meshing type dog clutches. For example, in the case of the electromagnetic clutches, the hydraulic control circuit 42 is made up of a switching device, an electromagnetic switching device, etc., that switch an electric command signal circuit to the electromagnetic clutches, instead of a valve device that switches oil passages.

Although the automatic shifting portion 20 is serially coupled to the differential portion 11 via the transmitting member 18 in the embodiments, a counter shaft may be disposed in parallel with the input shaft 14 and the automatic shifting portion 20 may concentrically be disposed on the counter shaft. In this case, the differential portion 11 and the automatic shifting portion 20 are coupled in a power transmittable manner via a set of transmitting members made up of a counter gear pair, a sprocket, and a chain acting as the transmitting member 18, for example.

The power distribution mechanism 16 acting as the differential mechanism of the embodiment may be, for example, a differential gear device having a pinion rotationally driven by the engine 8 and a pair of bevel gears engaged with the pinion differentially coupled to the first electric motor M1 and the second electric motor M2.

Although the power distribution mechanism 16 of the embodiment is made up of one planetary gear device, the power distribution mechanism 16 may be made up of two or more planetary gear devices and may function as a transmission having three or more stages in the non-differential state (constant shift state). The planetary gear devices are not limited to the single pinion type and may be double pinion type planetary gear devices.

Although the temperature $T_{OIL}$ of the operating oil of the automatic shifting portion 20 is the same as the temperature $T_{M2}$ of the second electric motor M2 providing the regenerative control and the shift map storage means 116 stores a regenerative traveling shift map for each temperature in the embodiments, this is not a limitation. If the oil temperature $T_{OIL}$ of the operating oil of the automatic shifting portion 20 is different from the temperature $T_{M2}$ of the second electric motor M2 providing the regenerative control, a regenerative traveling shift map may be stored for each combination thereof.

Although the electric motor providing the regenerative control is the second electric motor M2 in the embodiments, this is not a limitation. Therefore, the regenerative control may be provided by both the first electric motor M1 and the second electric motor M2. In this case, although the temperature sensor 82 detects the temperature of the second electric motor M2 in the embodiments, the temperature sensor 82 may detect the temperature of the first electric motor M1. In other words, the temperature of the electric motor providing the regenerative control may only be detected. For example, any rotation element of the planetary gear device 24 of the differential portion 11 may be fixed and unable to rotate to allow the first electric motor M1 to provide the regenerative control. In this case, the loss in the power transmission device 10 may be a sum of a traveling loss in the automatic shifting portion 20 and a loss in the electric motor providing the regenerative control or may be a sum of a traveling loss in the automatic shifting portion 20 and a loss in the differential portion 11 having the first electric motor M1 and the second electric motor M2.

Although the power transmission device 10 has the power distribution mechanism 16 that distributes the drive force of the engine 8 to the first electric motor M1 and the automatic shifting portion 20 in the embodiments, this is not a limitation of the configuration of the power transmission device. In other words, the present invention is applicable to any power transmission device having at least one regenerative electric motor via the automatic shifting portion 20. Specifically, the power distribution mechanism 16 is not an essential configuration requirement and at least one electric motor may be included as the regenerative electric motor. The regenerative electric motor is not limited to the form of directly coupling to the input shaft 18 of the automatic shifting portion 20. Therefore, the present invention is applicable to a so-called parallel hybrid type power transmission device such as those having an electric motor coupled to a power transmitting member that transmits power from an engine to an automatic shifting portion, for example.

Figure 15:
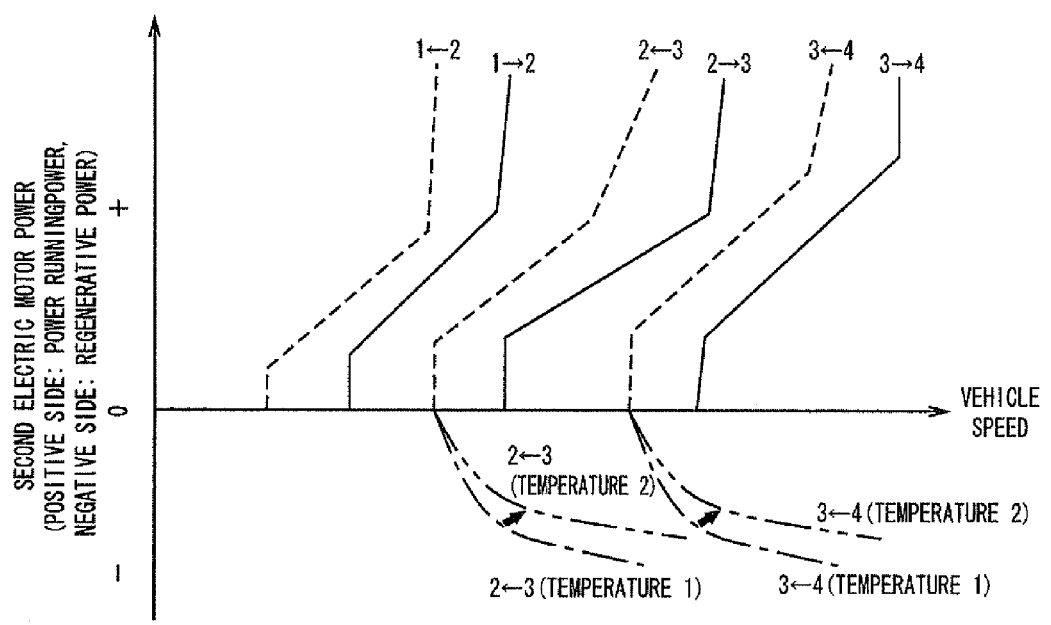
FIG. 15 is a diagram of an example of the regenerative traveling shift map having the vehicle speed and the torque of the second electric motor defined as the variables representative of the vehicle state, corresponding to FIG. 13.

In the second embodiment, as depicted in FIGS. 12 and 13, the variables representative of the vehicle state in the regenerative traveling shift map are the vehicle speed and the power of the second electric motor M2 providing the regenerative control. Alternatively, the regenerative traveling map may be defined as a map that uses the vehicle speed and the torque of the second electric motor M2 providing the regenerative control as the variables representative of the vehicle state. FIG. 15 is a diagram of an example of the regenerative traveling shift map having the vehicle speed and the torque of the second electric motor M2 providing the regenerative control defined as the variables representative of the vehicle state, corresponding to FIG. 13. The regenerative traveling shift map defined by the vehicle speed and the torque of the second electric motor M2 providing the regenerative control in this way may be stored in the shift map storage means 116. In this case, the vehicle state determining means 112 determines the execution of shift based on the vehicle state including the vehicle speed v and the output torque of the second electric motor M2 providing the regenerative control and the regenerative traveling shift map.

Although the second embodiment uses the regenerative traveling shift map using the vehicle speed v and the power of the second electric motor M2 providing the regenerative control or the vehicle speed v and the torque of the second electric motor M2 providing the regenerative control are used as the variables representative of the vehicle state as depicted in FIGS. 12, 13, and 15, the regenerative traveling shift map may be used that uses the vehicle speed v and the power of the differential portion 11 including the power distribution mechanism 16 made up of the second electric motor M2, the first electric motor M1, the differential gear device 24, etc., or the regenerative traveling shift map may be used that uses the vehicle speed v and the torque of the differential portion 11 instead.

Figure 16:
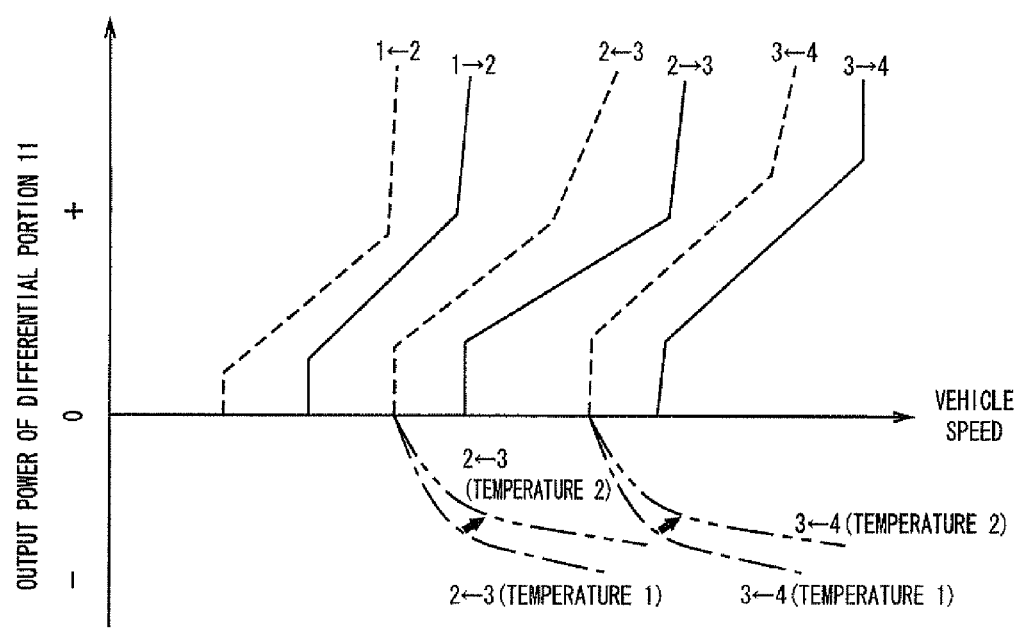
FIG. 16 is a diagram of an example of the regenerative traveling shift map having the vehicle speed and the power of the power division mechanism as the variables representative of the vehicle state.
Figure 17:
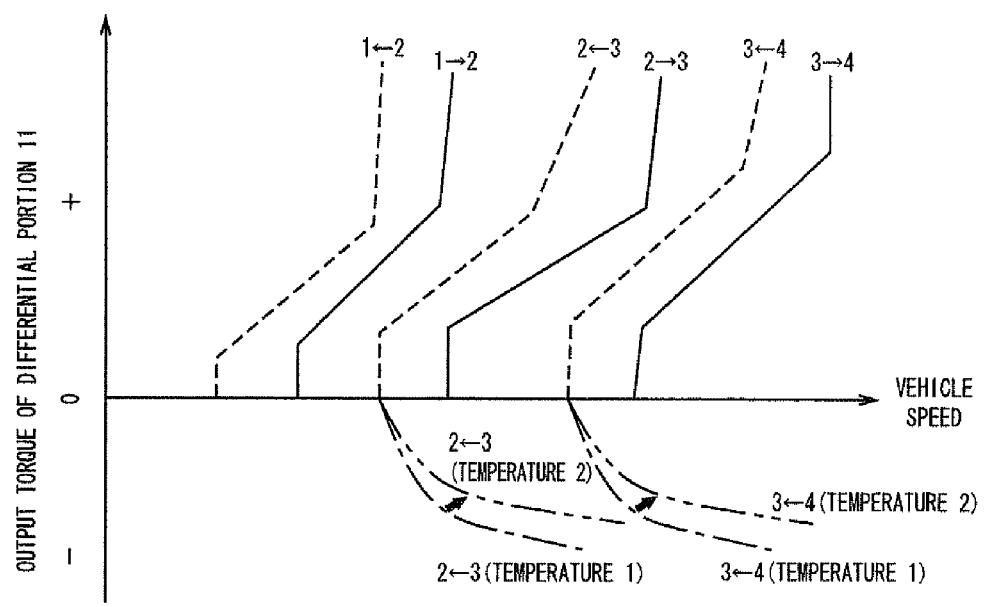
FIG. 17 is a diagram of an example of the regenerative traveling shift map having the vehicle speed and the torque of the power division mechanism as the variables representative of the vehicle state.

FIG. 16 is a diagram of an example of the regenerative traveling shift map having the vehicle speed and the power of the differential portion 11 as the variables representative of the vehicle state. FIG. 17 is a diagram of an example of the regenerative traveling shift map having the vehicle speed and the torque of the differential portion 11 as the variables representative of the vehicle state. These figures correspond to FIG. 13. The shift map storage means 116 may store the regenerative traveling shift map defined by the vehicle speed and the power or torque of the differential portion 11 providing the regenerative control in this way. In this case, the vehicle state determining means 112 determines the execution of shift based on the vehicle state including the vehicle speed v and the power or torque of the differential portion 11 and the regenerative traveling shift map. By defining the power or torque of the differential portion 11 as the vehicle state instead of the power or torque of the second electric motor M2, the shift of the automatic shifting portion 20 can be determined while the regenerative control is provided in consideration of the reduction of deterioration in the efficiency of the power transmission device 10 even if the regenerative control is provided by the first electric motor M1 and the second electric motor M2 making up the differential portion 11 in a coordinated manner or by any one of the both motors.

Although the inverter loss calculating means 122 calculates a loss in the inverter 58 in the embodiments, the calculation is not limited to obtain the loss in the inverter 58 itself and may be performed for a loss in an electric device not depicted for driving the first electric motor M1 and the second electric motor M2 other than the inverter 58.

Although not exemplary illustrated one by one, the present invention is implemented with various modifications applied without departing from the spirit thereof.

The invention claimed is:

1. A control device for a vehicle power transmission device including
    a shifting portion and an electric motor that provides regeneration via the shifting portion,
    the control device executing a downshift of the shifting portion if a traveling loss in the vehicle power transmission device after the downshift is smaller than a traveling loss in the vehicle power transmission device at a current gear ratio during regenerative traveling, and
    the traveling loss in the vehicle power transmission device including at least one of a loss in the shifting portion and a loss in the electric motor, the loss in the shifting portion being calculated based on an operating oil temperature of the shifting portion and the loss in the electric motor being calculated based on a temperature of the electric motor.

2. The control device for a vehicle power transmission device of claim 1, wherein
    the control device has a regenerative traveling shift map set in accordance with a vehicle speed and a power of the electric motor for executing the downshift of the shifting portion during the regenerative traveling, and wherein
    the control device executes the downshift based on the regenerative traveling shift map during the regenerative traveling.

3. The control device for a vehicle power transmission device of claim 1, wherein
    the control device has a regenerative traveling shift map set in accordance with a vehicle speed and a torque of the electric motor for executing the downshift of the shifting portion during the regenerative traveling, and wherein
    the control device executes the downshift based on the regenerative traveling shift map during the regenerative traveling.

4. The control device for a vehicle power transmission device of claim 1, wherein
    a shifting point for executing the downshift of the shifting portion is set in advance depending on the operating oil temperature of the shifting portion such that the downshift of the shifting portion is executed if the traveling loss in the vehicle power transmission device after the downshift is smaller than the traveling loss in the vehicle power transmission device at the current gear ratio.

5. The control device for a vehicle power transmission device of claim 2, wherein
    a shifting point for executing the downshift of the shifting portion is set in advance depending on the operating oil temperature of the shifting portion such that the downshift of the shifting portion is executed if the traveling loss in the vehicle power transmission device after the downshift is smaller than the traveling loss in the vehicle power transmission device at the current gear ratio.

6. The control device for a vehicle power transmission device of claim 3, wherein
    a shifting point for executing the downshift of the shifting portion is set in advance depending on the operating oil temperature of the shifting portion such that the downshift of the shifting portion is executed if the traveling loss in the vehicle power transmission device after the downshift is smaller than the traveling loss in the vehicle power transmission device at the current gear ratio.

7. The control device for a vehicle power transmission device of claim 1, wherein
    a shifting point for executing the downshift of the shifting portion is set in advance depending on the temperature of the electric motor such that the downshift of the shifting portion is executed if the traveling loss in the vehicle power transmission device after the downshift is smaller than the traveling loss in the vehicle power transmission device at the current gear ratio.

8. The control device for a vehicle power transmission device of claim 2, wherein
    a shifting point for executing the downshift of the shifting portion is set in advance depending on the temperature of the electric motor such that the downshift of the shifting portion is executed if the traveling loss in the vehicle power transmission device after the downshift is smaller than the traveling loss in the vehicle power transmission device at the current gear ratio.

9. The control device for a vehicle power transmission device of claim 3, wherein
    a shifting point for executing the downshift of the shifting portion is set in advance depending on the temperature of the electric motor such that the downshift of the shifting portion is executed if the traveling loss in the vehicle power transmission device after the downshift is smaller than the traveling loss in the vehicle power transmission device at the current gear ratio.

10. The control device for a vehicle power transmission device of claim 1, wherein
    the vehicle power transmission device includes a differential portion disposed on a power transmission path from a prime mover to a drive wheel, and wherein
    the differential portion includes a first electric motor and a second electric motor coupled in a power transmittable manner to two respective rotating elements among rotating elements of the differential portion.

11. The control device for a vehicle power transmission device of claim 2, wherein
the vehicle power transmission device includes a differential portion disposed on a power transmission path from a prime mover to a drive wheel, and wherein
the differential portion includes a first electric motor and a second electric motor coupled in a power transmittable manner to two respective rotating elements among rotating elements of the differential portion.

12. The control device for a vehicle power transmission device of claim 3, wherein
the vehicle power transmission device includes a differential portion disposed on a power transmission path from a prime mover to a drive wheel, and wherein
the differential portion includes a first electric motor and a second electric motor coupled in a power transmittable manner to two respective rotating elements among rotating elements of the differential portion.

13. The control device for a vehicle power transmission device of claim 4, wherein
the vehicle power transmission device includes a differential portion disposed on a power transmission path from a prime mover to a drive wheel, and wherein
the differential portion includes a first electric motor and a second electric motor coupled in a power transmittable manner to two respective rotating elements among rotating elements of the differential portion.

14. The control device for a vehicle power transmission device of claim 5, wherein
the vehicle power transmission device includes a differential portion disposed on a power transmission path from a prime mover to a drive wheel, and wherein
the differential portion includes a first electric motor and a second electric motor coupled in a power transmittable manner to two respective rotating elements among rotating elements of the differential portion.

15. The control device for a vehicle power transmission device of claim 6, wherein
the vehicle power transmission device includes a differential portion disposed on a power transmission path from a prime mover to a drive wheel, and wherein
the differential portion includes a first electric motor and a second electric motor coupled in a power transmittable manner to two respective rotating elements among rotating elements of the differential portion.

16. The control device for a vehicle power transmission device of claim 10, wherein
the differential portion includes a first element coupled to the prime mover, a second element coupled to the first electric motor, and a third element coupled to a transmitting member that transmits an output of the differential portion to the shifting portion, and the second electric motor is coupled to the third element.

17. The control device for a vehicle power transmission device of claim 16, wherein
the control device has a regenerative traveling shift map set in accordance with a vehicle speed and a power of the second electric motor for executing the downshift of the shifting portion during the regenerative traveling, and wherein
the control device executes the downshift based on the regenerative traveling shift map during the regenerative traveling.

18. The control device for a vehicle power transmission device of claim 16, wherein
the control device has a regenerative traveling shift map set in accordance with a vehicle speed and a torque of the second electric motor for executing the downshift of the shifting portion during the regenerative traveling, and wherein
the control device executes the downshift based on the regenerative traveling shift map during the regenerative traveling.

19. The control device for a vehicle power transmission device of claim 1, wherein the shifting portion is a mechanical stepped transmission.

20. The control device for a vehicle power transmission device of claim 1, wherein
the loss in the electric motor includes a loss in an inverter related to a drive of the electric motor.

* * * * *